ic Patent
Sorensen et al.

[11] 4,075,692
[45] Feb. 21, 1978

[54] DATA PATH CONFIGURATION FOR A DATA PROCESSING SYSTEM

[75] Inventors: Karsten Sorensen, Lexington; David H. Bernstein; Michael B. Druke, both of Cambridge, all of Mass.

[73] Assignee: Data General Corporation, Southboro, Mass.

[21] Appl. No.: 737,416

[22] Filed: Nov. 1, 1976

Related U.S. Application Data

[60] Division of Ser. No. 646,351, Jan. 2, 1976, Pat. No. 4,014,006, which is a continuation of Ser. No. 387,523, Aug. 10, 1973, abandoned.

[51] Int. Cl.² .............................................. G06F 7/38
[52] U.S. Cl. ................................................. 364/200
[58] Field of Search .................. 340/172.5; 445/1; 364/200

[56] References Cited

U.S. PATENT DOCUMENTS 3,564,507  2/1971  Faivre et al. ................. 340/172.5
3,701,105  10/1972  Finnegan et al. .............. 340/172.5

Primary Examiner—Harvey E. Springborn
Attorney, Agent, or Firm—Robert F. O'Connell

[57] ABSTRACT

A data processing system in which the central processor unit operates asynchronously with one or more memory units independently of the operating speed of the memory units wherein the central processor timing signal and the memory timing signal have a predetermined phase relationship. The central processor unit is arranged to remain operative even when the memory unit is enabled unless it is disabled by a signal from the memory unit under preselected conditions. The central processor generates a plurality of operating instruction signals for transfer to the memory unit to permit the latter to perform its desired functions by enabling the memory unit, inhibiting the transfer of data from the memory unit to a data bus and permitting storage of data from the central processor unit when data is acceptable for such storage. A further operating instruction signal is generated at the central processor unit to permit data read from the memory unit to be modified at the central processor unit and stored in the memory unit after such modification. A further operating instruction signal is generated internally to the memory unit to prevent operation of all other memory devices in the memory unit when one of the memory devices therein is in operation.

The logic for providing operation in a program or a non-program operating state is arranged to utilize one or more relatively small read-only-memory units for each of a plurality of selected groups of program and non-program operating states, each group using only one or two of such read-only-memory units for such purpose.

The central processor unit further includes a unique arrangement interconnecting a skew protected, tri-state register file having two read and two write ports with an arithmetic logic unit having an output and an A-input and a B-input.

5 Claims, 42 Drawing Figures

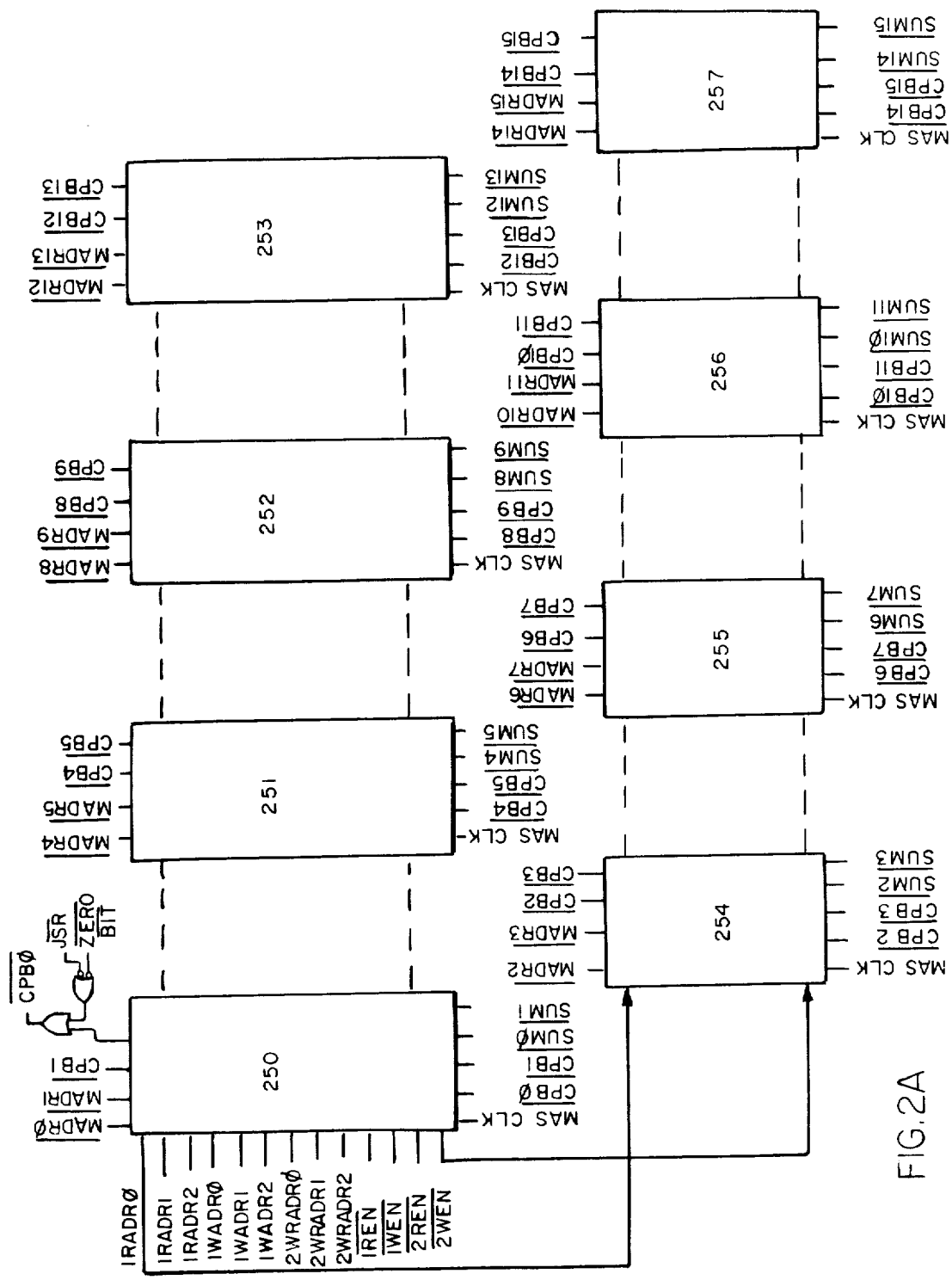

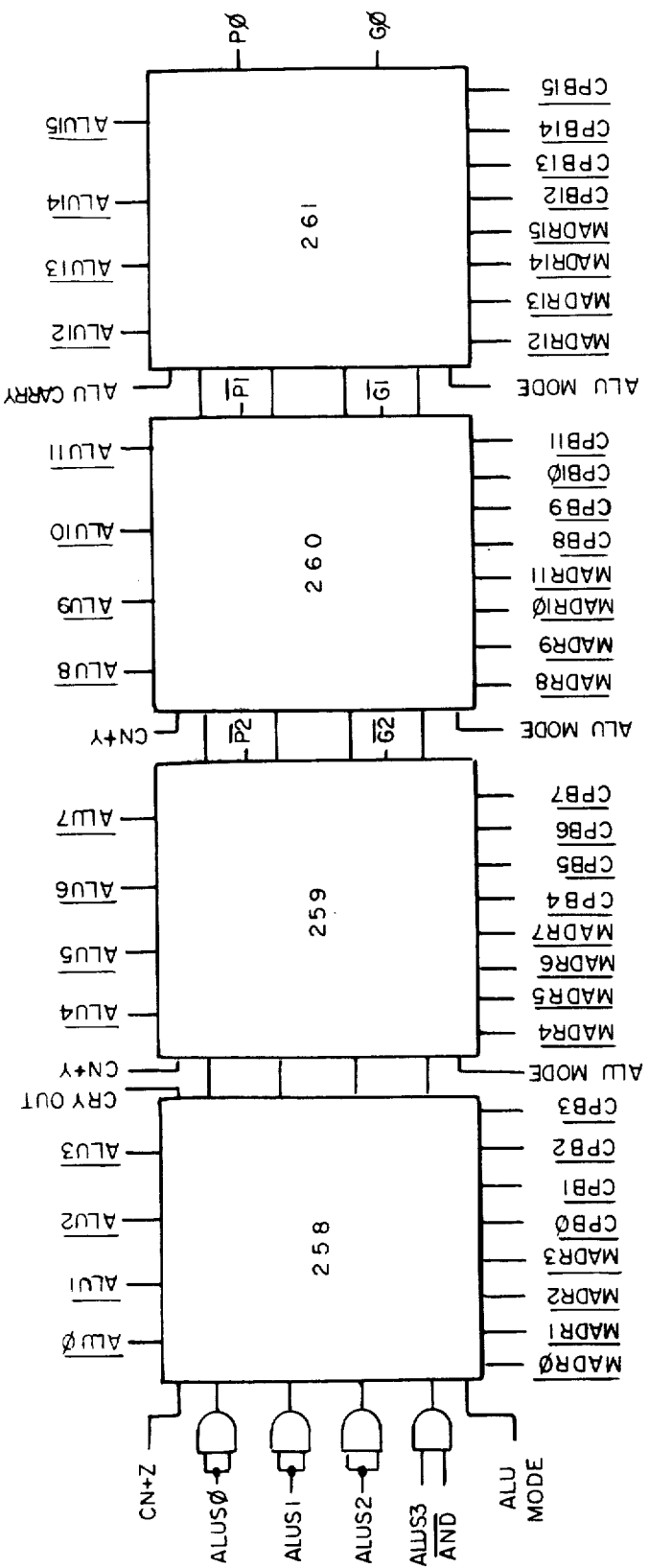
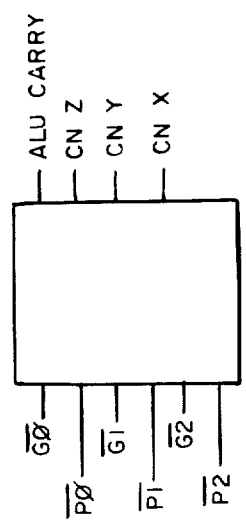
FIG. 2B

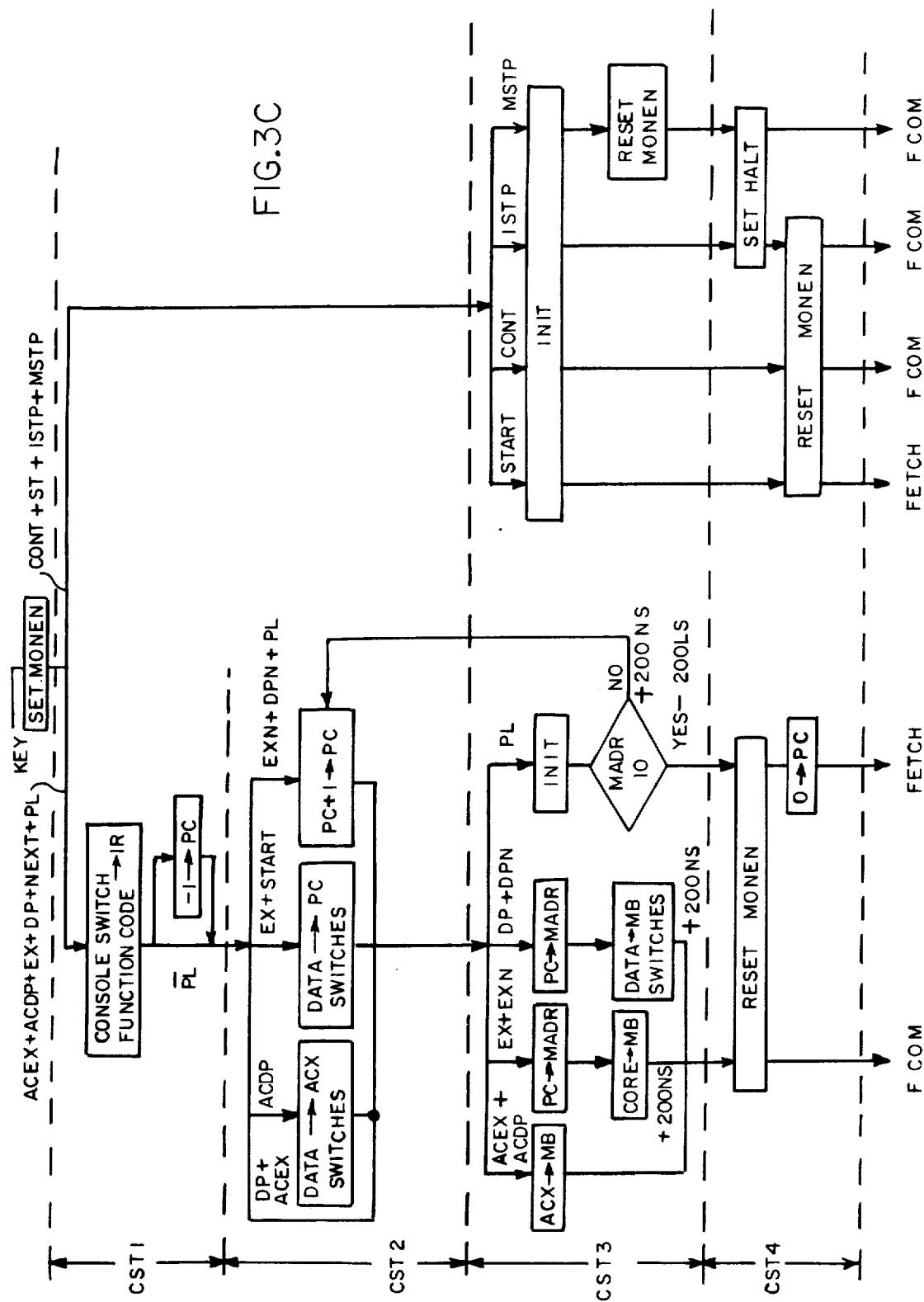

FETCH/DEFER STATE GROUP

| | FETCH·SKIP | FETCH·$\overline{\text{SKIP}}$ | DEFER·$\overline{\text{AUTO}}$ (MRI) | AUTO INC (DEFER MRI) | AUTO DEC (DEFER MRI) | PI (FETCH) |
|---|---|---|---|---|---|---|
| PTS0 | PC+1 → PC<br>$\overline{\text{2REN}}$, 2WEN, PTGHOLD, INCA, 2WRADRI<br>CLEAR SKIP, INCA<br>NOTE: SKIP FORCE MACH TO CONT. RUNNING<br>ADD: PC<br>DATA: (empty)<br>STATE: F | PC → MA<br>PC−1 → PC<br>DATA → IR<br>2REN, 2WEN, IWEN, 2WRADRI, INCA, MEMEN<br>LOAD IR, CLEAR (FETCH)<br>(SET DEFER)<br>ADD: PC<br>DATA: SELECTED MB<br>STATE: F | MA → MADR<br>MA → TEMP1<br>DATA → MA<br>2WEN, 2WRADR2, 1WEN, 2WRADDI, PTG HOLD MEMEN<br>CLEAR DEFER AUTOEN<br>(SET AUTO → RMW)<br>ADD: MA<br>DATA: SELECTED MB<br>STATE: D | MA+1 → MA<br>INCA, 2REN, 2WEN<br>ADD: MA<br>DATA: MA<br>STATE: D | MA−1 → MA<br>DECA, 2REN, 2WEN<br>ADD: MA<br>DATA: MA<br>STATE: D | ∅ → MADR<br>PC → MB<br>MEMEN WRITE 2REN ZEROBIT 2WRADRI<br>CLEAR ION (NO IREN)<br>ADD: 0<br>DATA: PC<br>STATE: F |
| PTS1 | NULL | NULL | EFA → MA<br>(ON DIRECT JMP SET FETCH AND EFA → PC)<br>ADD: AC2 MA AC2 A3<br>DATA: SELECTED MB<br>STATE: (empty) | TEMP1 → MADR<br>MA → DATA<br>WRITE, CLEAR DEFER<br>2REN, CLEAR AUTO<br>ADD: TEMP1<br>DATA: MA<br>STATE: D | TEMP1 → MADR<br>MA → DATA<br>WRITE, CLEAR DEFER<br>2REN, CLEAR AUTO<br>ADD: TEMP1<br>DATA: MA<br>STATE: D | 1 → MA<br>C(1) → IR<br>INCA, 2WEN, LOAD IR<br>SET DEFER, CLEAR FETCH<br>(NO IREN)<br>ADD: 1<br>DATA: SELECTED MB<br>STATE: F |

ARITHMETIC/IO STATE GROUP

| | ALC | I/O IN MNM | I/O IN $\overline{\text{MNM}}$ | I/O OUT MNM | I/O OUT $\overline{\text{MNM}}$ | I/O SKIP |
|---|---|---|---|---|---|---|
| PTSØ | NULL | MNM S,C+P<br>SET FETCH<br>PTG HOLD<br>EXTEND TO<br>600 N.S. | PTG HOLD<br>SET FETCH<br>300 N.S. | MNM<br>SET FETCH<br>PTG HOLD<br>EXTEND TO<br>600 N.S. | PTG HOLD<br>SET FETCH<br>300 N.S. | NULL |
| PTS1 | ACS⊕ACD→ACD<br>IRI-2→IRADR<br>IR3-4→2RADR<br>2 REN =f (IR5)<br>ALU = f (IR5,6,7)<br>2 WEN=f (IRI2)<br>SET FETCH<br>TEST FOR SKIP<br><br>ADD [AC (1,2)]<br>DATA [AC (3,4)]<br>STATE [E] | DATA→ACX<br>IR3-4→IWADR<br>DATA I, $\overline{\text{IWEN}}$, IN<br>EXTEND<br>EXTEND TO<br>600 N.S.<br><br>ADD [MA]<br>DATA [DATA]<br>STATE [E] | DATA→ACX<br>IR3-4→IWADR<br>DATA I, $\overline{\text{IWEN}}$, IN<br>EXTEND<br>EXTEND TO<br>600 N.S.<br><br>ADD [MA]<br>DATA [DATA]<br>STATE [E] | ACX→DATA<br>IR3-4→2RADR<br>DATA O, $\overline{\text{2REN}}$, OUT<br>EXTEND<br>EXTEND CYCLE TO<br>800 N.S.<br><br>ADD [MA]<br>DATA [ACX]<br>STATE [E] | ACX→DATA<br>IR3-4→2RADR<br>DATA O, $\overline{\text{2REN}}$, OUT<br>EXTEND<br>EXTEND CYCLE TO<br>800 N.S.<br><br>ADD [MA]<br>DATA [ACX]<br>STATE [E] | TEST FOR SKIP IN<br>SET FETCH<br>EXTEND<br>EXTEND CYCLE TO<br>600 N.S.<br><br>ADD [MA]<br>DATA<br>STATE [E] |

FIG. 4B

DATA CHANNEL STATE GROUP

| | DCH INIT | DCH IN (HIGH) | DCH IN (LOW) | DCH OUT | DCH INC |
|---|---|---|---|---|---|
| PTS0 | 00XX0 (HIGH SPEED)<br>DCHA MONA DPE<br>IWEN IWADR2<br>ADDRESS ON → TEMP1<br>DATA BUS<br>00XX1 (LOW SPEED)<br>SAME PLUS<br>SLDCH, EXTEND<br>HS = 300 NS<br>LS = 800 NS | 10010 (HIGH SPEED)<br>MEMEN DPE<br>WRITE, CLRDCH<br>MON1, DCHI<br>DATA → MB<br>HS 500 NS | 10011 (LOW SPEED)<br>MEMEN IWEN<br>RMW, IWADR1<br>IWADR2 SLDCH<br>INHTRANS DCHI<br>MON1, EXTEND<br>FRQ<br>DATA → TEMP2<br>LS 800 NS | (HIGH AND LOW SPEED)<br>1011X<br>MEMEN IWEN<br>IWADR2<br>FRQ<br>DATA → TEMP2<br>HS 500 NS<br>LS 500 NS | (HIGH AND LOW SPEED)<br>1010X RMW<br>MEMEN, 2WEN FRQ<br>DATA+1 → TEMP2<br>HS 600 NS<br>LS 600 NS |
| PTS1 | NULL | NULL | 11001 (LOW SPEED)<br>WE WRITE DPE<br>CLEAR DCH, 2REN<br>TEMP2 → MB<br>LS = 300 NS | (HIGH AND LOW SPEED)<br>1110X<br>MONO, CLEAR DCH<br>SL DCH, 2REN<br>DPE, DCHO<br>TEMP2 → DATA<br>HS = 400 NS<br>LS = 800 NS<br>EXTEND | (HIGH AND LOW SPEED)<br>0101X<br>SL DCH, 2REN<br>WE, DPE<br>MONOZR MONO<br>WRITE OVFLO<br>DCHO CLEAR DCH<br>TEMP2 → DATA<br>HS = 400 NS<br>LS = 800 NS<br>EXTEND |

FIG. 4C

CONSOLE STATE GROUP

| CST1 | CST2 | CST3 | CST4 |
|---|---|---|---|
| SET KEY<br>SET MOMEN<br>CON INST LOAD IR<br>CONSOLE SWITCH ⟶ IR<br>FUNCTION CODE<br>$\overline{CONRQ}$ $\overline{RESET}$ | ACDP<br>DATA⟶ACX<br>SWITCHES<br>$\overline{CON\ DATA}$ $\overline{IWEN}$ $\overline{F34}$ | ACEX + ACDP<br>ACX ⟶ MB<br>$\overline{MB\ LOAD}$, $\overline{2REN}$<br>$\overline{F34}$ | PL + RESTART<br>∅ ⟶ PC<br>$\overline{IWEN}$, $\overline{IWADRI}$ |
|  | EX+START<br>DATA SWITCH ⟶ PC<br>$\overline{CON\ DATA}$ $\overline{IWEN}$<br>$\overline{IWADRI}$ | EX+EXN<br>PC ⟶ MADR<br>$\overline{MEMEN}$, $\overline{IREN}$<br>CORE ⟶ MB<br>+200 NS | MSTP<br>RESET MOMEN |
| PL<br>$\overline{2\ WEN}$, $\overline{2WRADRI}$<br>ALU CARRY = LOW<br>ALUS3 = LOW<br>ALUS2 = LOW<br>−1 ⟶ PC | EXN+ DPN + PL<br>PC+1 ⟶ PC<br>$\overline{2\ REN}$ $\overline{INCA}$<br>$\overline{2WRADRI}$ $\overline{2WEN}$ | DP+DPN<br>PC ⟶ MADR<br>$\overline{MEMEN}$, CON DATA $\overline{WRITE}$<br>$\overline{IREN}$, DATA SN ⟶ MB<br>+200 NS |  |
|  |  | PL<br>$\overline{MEMEN}$, $\overline{INIT}$ $\overline{WRITE}$<br>PL ROMEN, SET FETCH<br>TEST FOR MADR=10<br>+200 NS |  |
|  |  | START + CONT<br>+ISTP+MSTP<br>$\overline{INIT}$, $\overline{SET\ FETCH}$ |  |

FIG 4D

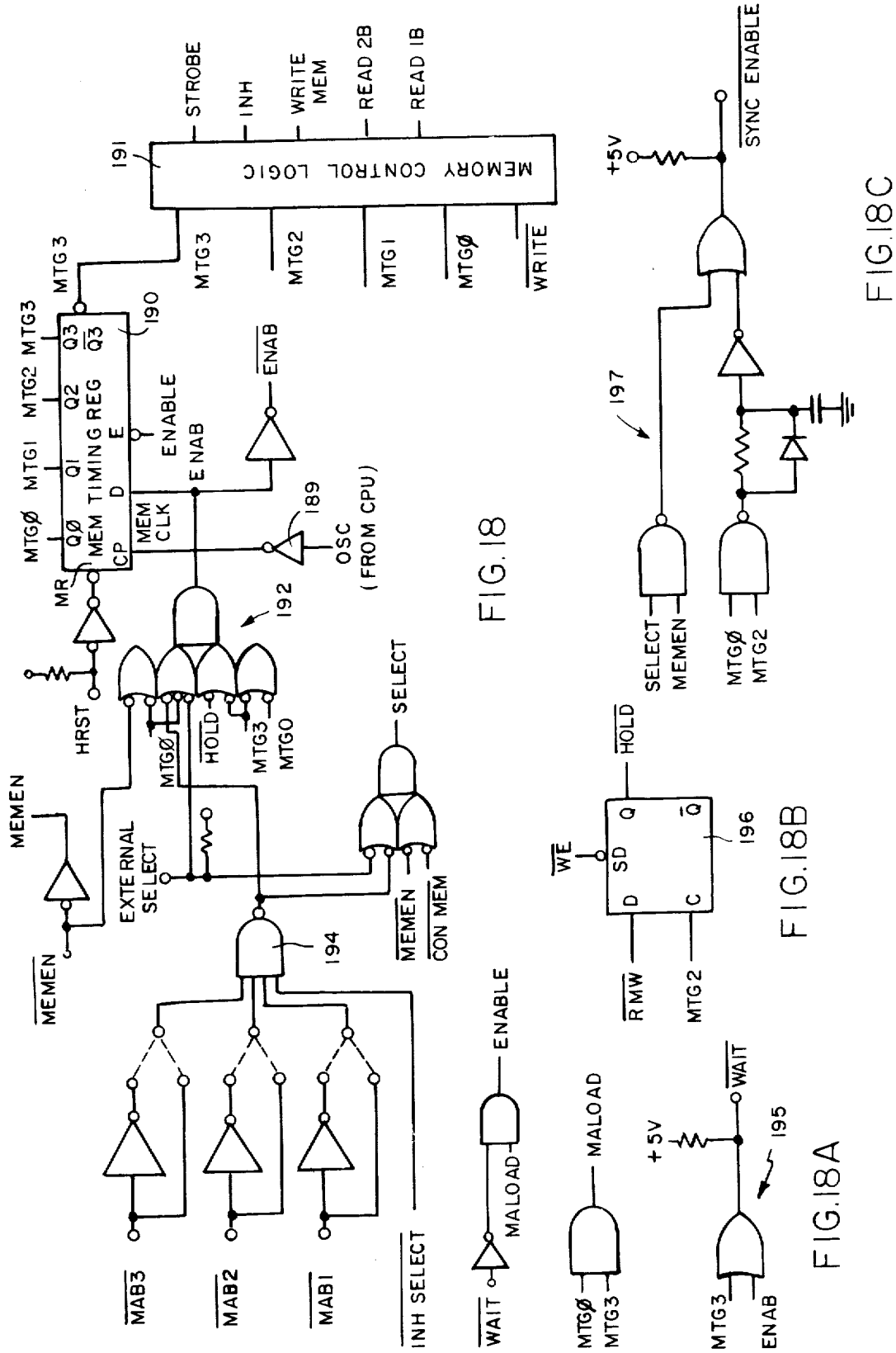

DATA PATH CONFIGURATION FOR A DATA PROCESSING SYSTEM

This is a division of application Ser. No. 646,351, filed Jan. 2, 1976 now U.S. Pat. No. 4,014,006, issued Mar. 22, 1977, which is in turn a continuation of application Ser. No. 387,523, filed Aug. 10, 1973.

INTRODUCTION

This invention relates generally to data processing systems and, more particularly, to data processing systems wherein the central processor unit thereof operates asynchronously with the memory unit thereof.

BACKGROUND OF THE INVENTION

In most conventional data processing systems the central processor unit thereof is generally arranged to operate synchronously with the memory units of the system at a synchronous rate which is related to the speed of operation of the memory unit with which it is used. The memory functions are controlled by the central processor unit (CPU) and the two units are then synchronously operated by the use of appropriate timing signals communicated therebetween.

In such apparatus the data processing system functions by transferring data among its internal registers, its memory, and its input-output (I/O) devices, which data transfer involves movements of data between a source and a destination either directly or through intervening units, such as an arithmetic logic unit (ALU), which appropriately modify the date which is being transferred. In such cases the data transfers with I/O devices occur over a bi-directional I/O bus while data transfers with memory usually occur over a bi-directional memory bus. In addition, the apparatus has an appropriate independent memory address bus for transferring memory address data.

Operation of the CPU asynchronously with the memory unit permits the CPU to be adapted for use with a plurality of different memory systems each of which may operate at a different speed, independently of the speed of operation of the CPU. The memory units can then be arranged so as to be capable of performing their own functions without regard to the internal operating speed of the CPU.

DESCRIPTION OF THE PRIOR ART

In prior art computer systems the central processor unit thereof operates either synchronously or asynchronously with the memory units. In the former case a single clock is utilized to assure that correct sequencing of the overall data processing operation occurs, both the CPU and the memory being timed directly from the same timing clock. In the latter case separate and effectively independently operated timing systems, or clocks, are used in the CPU and in the memory unit, there being no effective relationship between the two independently operated clocks. In order to assure that the desired sequence of operations occurs in the CPU and the memory unit, the synchronizing of their operations is usually accomplished through appropriate sensing of operating state changes as certain operating signals pass from one binary level to another (i.e., an edge sensitive synchronizing operation). Relatively elaborate sensing and synchronizing circuitry is usually required for such purpose and its implementation can be relatively expensive. Further, correct operation thereof is not always assured under all operating conditions since the phase relationship between the CPU and memory clock signals is not known or controlled.

Further, is presently known asynchronously operated data processing systems, the central processor unit and the control signals used to coordinate its operation with that of the memory unit are designed so that once the CPU initiates the operation of the memory unit, operation of the CPU is effectively halted until an appropriate control signal is received from the memory unit to permit resumption of the CPU operation. In such an arrangement, the overall processing time is increased over that which would be required if the CPU were permitted to proceed with at least certain operations simultaneously with the operation of the memory unit.

SUMMARY OF THE INVENTION

In the data processing apparatus of the invention, asynchronous operation is achieved in a manner which reduces the complexity and expense associated with controlling the operational sequence of the CPU and memory unit in previously known asynchronous systems and which tends to reduce the overall data processing time required to perform a sequence of operating state changes. In accordance therewith the CPU timing system and the memory timing system are arranged so that the clock signals produced thereby have a predetermined phase relationship. Such phase relationship is effectively achieved independently of the operating speed of the memory unit with which the CPU is operating. In effect, the timing is asynchronous in the sense that the CPU can operate with memory units having different operating speeds, while at the same time the overall timing of the memory unit is made adaptively synchronous to that of the CPU. No matter what the speed of operation of the memory, a known and predetermined phase relationship between the memory clock pulses and the CPU clock pulses is maintained.

Further, the CPU is designed so that its operation continues even after it has initiated a memory cycle of operation, so that the CPU operation is halted via an appropriate operation instruction signal only when necessary in connection with the operational requirements of the memory unit. Thus, proper operational sequencing is maintained with memories having different operational speeds and the overall processing time tends to be reduced over that achieved with previously known asynchronous systems.

Further, in order to provide efficient asynchronous operation between the CPU, the memory unit and I/O devices associated therewith, in addition to providing appropriately related CPU and memory timing signals, the data processing system of the invention provides a plurality of designated operation instruction signals for appropriately permitting the memory unit to function effectively independently of the CPU. Further, a significant reduction in the logic required for operating the system is achieved by combining the data and memory busses to form a single common bi-directional bus for data transfers among the memory unit, the CPU and I/O devices. The designated operating instruction signals are separately transferred between the CPU and memory unit by the provision of a plurality of separate operating instruction transfer busses for such purpose. The CPU/Memory timing phase relationship, the particular operating instruction signals, which are discussed in more detail below, and the appropriate bus arrangement in the system provide an efficiently operating asynchronous data processing apparatus having distinct advantages over conventional synchronous or other presently known asynchronous systems.

Further, the data processing system of the invention provides operation in a plurality of program operating states and has a further capability for providing operating states for use with external devices, such as a console and/or devices in external data channels. In prior art data processing systems, such operations have required the use of extensive timing and program logic for permitting appropriate access to the computer by such external devices. Some systems make use of microprocessor operation utilizing, for example, a single, relatively large, read-only-memory (ROM) array requiring a relatively long microprocessor control word and elaborate decoding logic therefor in order to generate the desired operating states for such purposes.

In the data processing system of the invention, various program, console and external data channel operating states are controlled through the use of uniquely selected, and relatively small, read-only-memory arrays each requiring only one or two ROM units utilizing relatively short input control words to produce the desired operating state signals. Accordingly, the decoding logic needed to generate the desired operating state signals is minimized. As discussed in more detail below, the program operating states are divided into three selected major state groups, each group being controlled by the use of one or two 5-bit input ROM's. Thus, two special ROM units (SPEC ROM's) are used for selected instruction, address and data movement and data modification operations, two memory reference instruction ROM units (MRI ROM's) are used for selected program sequence alteration and further data movement and modification operations and a single ROM unit (IOALC ROM) is used for arithmetic calculations and data movement with respect to peripheral (I/O) devices under program control. Other state groups are selected with reference to external data channel operation wherein two data channel ROM units (DCH ROM's) are used and with reference to console operation wherein a further pair of ROM units (CONSOLE ROM's) are used.

Further, the central processor unit (CPU) of the data processing system of the invention utilizes a unique configuration on interconnections among the CPU register file, the arithmetic logic unit, and the separately connected instruction register (IR) which permits an optimization of the data transfers among such units and the memory unit so as to reduce the overall processing time during many operations. Such configuration takes advantage of the use of a presently available skew protected, tri-state, quadriport register. Under the operation constraints imposed on the units, an optimum configuration for their interconnection is discussed in more detail below for such purpose.

Other aspects of the data processing system of the invention are discussed in more detail below in accordance with the figures and descriptions of the invention set forth herein.

FIGS. 2, 2A, 2B and 2C show block diagram configurations of the interconnections among the register file, arithmetic-logic unit and instruction register of the central processor unit and the data transfer paths with reference to the memory unit and I/O devices;

FIGS. 3, 3A, 3B and 3C are flow charts showing the flow paths for the operating states of the data processing system of the invention;

FIGS. 4, 4A, 4B, 4C and 4D are state charts showing the operations and required signals for each of the various operating states of the data processing system of the invention;

FIGS. 8 and 8A show miscellaneous logic arrays for providing various signals used in the operation of the data processing system of the invention;

FIG. 18 shows the basic timing generation logic in the memory unit of the data processing system of the invention;

FIG. 18A shows the logic array in the memory unit for producing the $\overline{\text{WAIT}}$ operating instruction signal;

FIG. 18B shows the logic array in the memory unit for producing the $\overline{\text{HOLD}}$ signal;

FIG. 18C shows the logic array in the memory unit for producing the $\overline{\text{SYNC ENABLE}}$ operating instruction signal;

DESCRIPTION OF THE INVENTION

Figure 1:
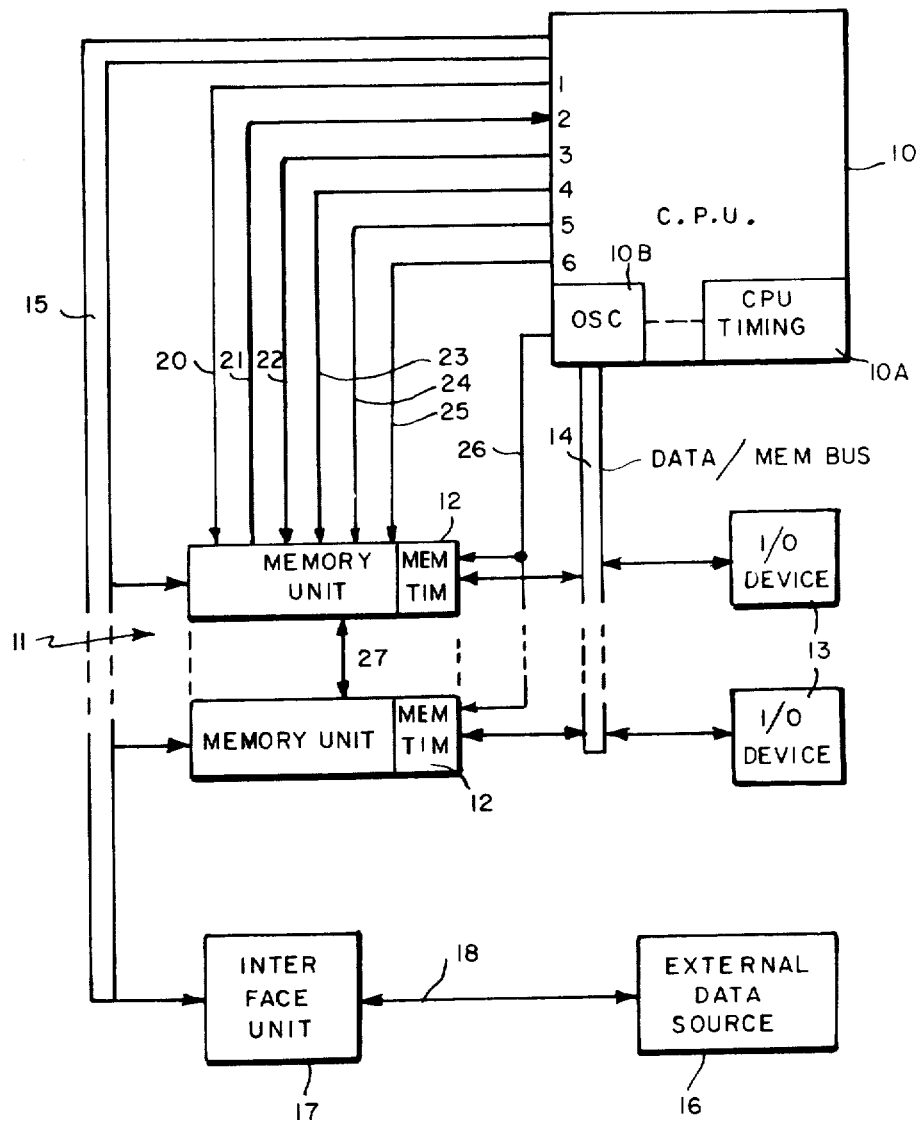
FIG. 1 shows a block diagram of the data and control signal interconnections between the central processor unit and memory units of the data processing system of the invention.

As can be seen in the broad block diagram of FIG. 1 the data processing system of the invention includes a central processor unit 10, one or more memory units 11 each including a plurality of suitable memory devices, and one or more I/O devices 13. A bus 14 identified as the "Data/Mem" bus provides for bi-directional transfer of data among the memory units 11, the CPU 10 and the I/O devices 13. A separate memory address bus 15 permits the transfer of memory address data from the CPU to the memory units or to an appropriate external data source 16 via a suitable interface unit 17 and a separate bi-directional I/O bus 18.

Figure 1A:
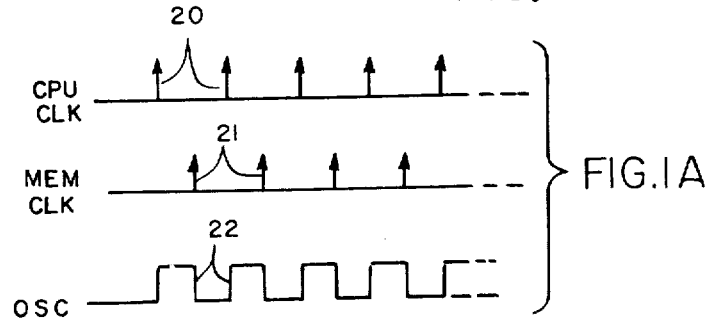
FIG. 1A shows a diagrammatic representation of the phase relationship among the CPU and memory clock pulses and the control oscillator therefor.

Suitable timing circuit 10A is utilized in the CPU to provide an appropriate CPU clock signal for providing the required timing of the operation thereof, which timing system is controlled by an oscillator 10B as shown and discussed in more detail below. Suitable memory timing circuitry 12 is associated with each of the memory units 11, the latter timing circuitry being controlled so that its clock signal has a predetermined phase relationship with the main timing clock signal of the CPU timing system. This relationship can be controlled via appropriate control of the memory clocks by the oscillator 10B, as visualized diagrammatically in FIG. 1A. The latter figure, for example, shows CPU clock pulses 20 generated by the CPU timing system and memory clock pulses 21 generated by a particular memory timing system associated with a particular memory unit 11. In accordance with the invention, it is desired that the memory clock pulses 21 maintain a substantially fixed phase relationship with reference to the CPU clock pulses 20 so that the former are effectively out of phase with the latter, as shown in FIG. 1A. Maintenance of such relationship assures that operation of the memory unit in question does not interfere with operation of the CPU and the proper operational sequence between such operations is maintained at all times without the need for elaborate synchronizing circuitry required in presently known asynchronous data processing systems wherein the memory clock and CPU clock operate completely independently of each other. The phase relationship can be controlled in a particular implementation by the output waveform 22 of the oscillator 10B, for example, via transfer line 26, so that the CPU clocks on an upgoing oscillator pulse and the memory clocks on a downgoing oscillator pulse.

For simplicity in explanation, the period of the oscillator pulse wave form and the CPU and memory clock pulses are shown effectively equal, although it should be realized that in a practical embodiment the oscillator pulse period is shorter than the clock pulse periods and the clock pulses are controlled by discrete multiples of the oscillator waveform. A specific implementation of such an approach is discussed in more detail below with particular reference to FIGS. 12 and 18.

A plurality of additional separate busses 20–25 between CPU 10 and memory units 11 are used for separately transferring designated operating instructions, discussed in more detail below, for permitting asynchronous operation of the memory unit. An additional bus 27 internal to the memory units permits the transfer of an appropriately designated operating signal in furthermore of such asynchronous operation.

A first operating instruction signal is designated as the $\overline{\text{MEMEN}}$ signal which enables the memory unit so that it can begin its operation. The $\overline{\text{MEMEN}}$ signal is generated within the CPU and is transferred thereform via bus 20 for use in the memory unit, as discussed in more detail below.

A second operating instruction signal is designated as the $\overline{\text{WRITE}}$ signal and acts as a memory buffer inhibit signal. The $\overline{\text{WRITE}}$ signal is generated at the CPU for transfer over bus 22 to the memory unit so as to inhibit the transfer of data in any of the memory buffer elements of the memory unit on to the Data/Mem bus until the CPU is ready to receive such data.

A third operating instruction signal is designated as a "write-enable" or $\overline{\text{WE}}$ signal and is transferred from the CPU to the memory unit over transfer bus 23. This signal permits the writing of data into the memory unit signifying in effect that the data which is available at the memory buffer from the CPU via the Data/Mem bus is acceptable for writing.

A fourth operating instruction signal is designated as a "read-modify-write" or $\overline{\text{RMW}}$ signal and is transferred from the CPU to the memory unit via transfer bus 24. Such signal permits data which has been read from the memory unit to be modified and rewritten into a memory device thereof.

A fifth operating signal is designated as the $\overline{\text{SYNC ENABLE}}$ signal which arises in the memory unit 11 and is transferred from the memory unit to the CPU over bus 21. The presence of the $\overline{\text{SYNC ENABLE}}$ signal at the CPU indicates that an appropriate memory device within memory unit 11 is being selected in accordance with a memory address which has been transferred from the CPU via the memory address bus 15 simultaneously with the transfer of the $\overline{\text{MEMEN}}$ signal. If the data which is to be read out of or written into the memory device which has been selected has not been placed on the Data/Mem bus at that time, the $\overline{\text{SYNC ENABLE}}$ signal operates as a "hold" signal for arresting the operation of the CPU until the data is available to or from the selected memory device.

The $\overline{\text{SYNC ENABLE}}$ signal need not be used when operating with high speed memory units wherein the memory cycle time is sufficiently short that the CPU does not require disabling before the beginning of the next operating cycle.

A sixth operating instruction signal designated as the $\overline{\text{EXTMBLOAD}}$ signal arises in the CPU and is transferred via transfer bus 25 to the memory unit. Such signal permits the loading of the memory buffer with data from an external data source without enabling the memory unit.

A seventh operating instruction is designated as the $\overline{\text{INHSELECT}}$/EXTSELECT signal. Such signal can be generated by appropriate external switching on the data processor and overrides any address which may be transferred on the memory address bus by inhibiting the selection of a memory device by such address and permitting a selection of a different address from an external source.

An operating instruction signal internal to the memory unit itself is designated as the $\overline{\text{WAIT}}$ signal and is transferred among memory devices within the memory unit via data transfer bus 27. Such signal inhibits the enabling of the memory unit by the $\overline{\text{MEMEN}}$ signal and in effect causes operation of the memory unit to be delayed until a particular selected memory device which is in operation at that time completes its cycle of operation. Such signal also is utilized to delay operation of the memory unit until the correct address is available from the CPU, i.e., the desired memory has been appropriately selected at the CPU and the correct address thereof has been placed on the memory address bus for transfer to the memory unit. Accordingly, the functioning of all other memory devices within the memory unit are suitably inhibited while the $\overline{\text{WAIT}}$ signal is present.

The operation of the system with the appropriate operating instruction signals discussed above is described below with particular reference to a system which represents a modification of a presently existing line of data processing apparatus now sold under the designation of Nova Computers by Data General Corporation, Southboro, Massachusetts. Reference is thereby made to the system reference manual for such computers entitled "How to Use the Nova Computers", published and available from Data General Corporation.

The Nova-line computers are general purpose computer systems with a 16-bit word length. Such machines are organized around four accumulators, two or which can be used as index registers. Any Nova-line computer can have both alterable memory and read-only-memory (ROM) and further may have either a programmer's console or a turn key console that has a minimum of controls. The central processor unit (CPU) is the control unit for the entire system and governs all peripheral I/O equipment, performs all arithmetic, logical, and data handling operations, and sequences the program. The processor handles words of 16 bits which are stored in an appropriate memory, the bits of a word being numbered 0–15, left to right, as are the bits in the registers that handle the words. Registers that hold addresses are 15 bits, numbered according to the position of the address in a word, i.e., 1–15. Words are used either as computer instructions in a program, as addresses, or as operands, (i.e., as data for the program). The program can interpret an operand as a logical word, an address, a pair of 8-bit bytes, or a 16-digit signed or unsigned binary number.

Figure 2:
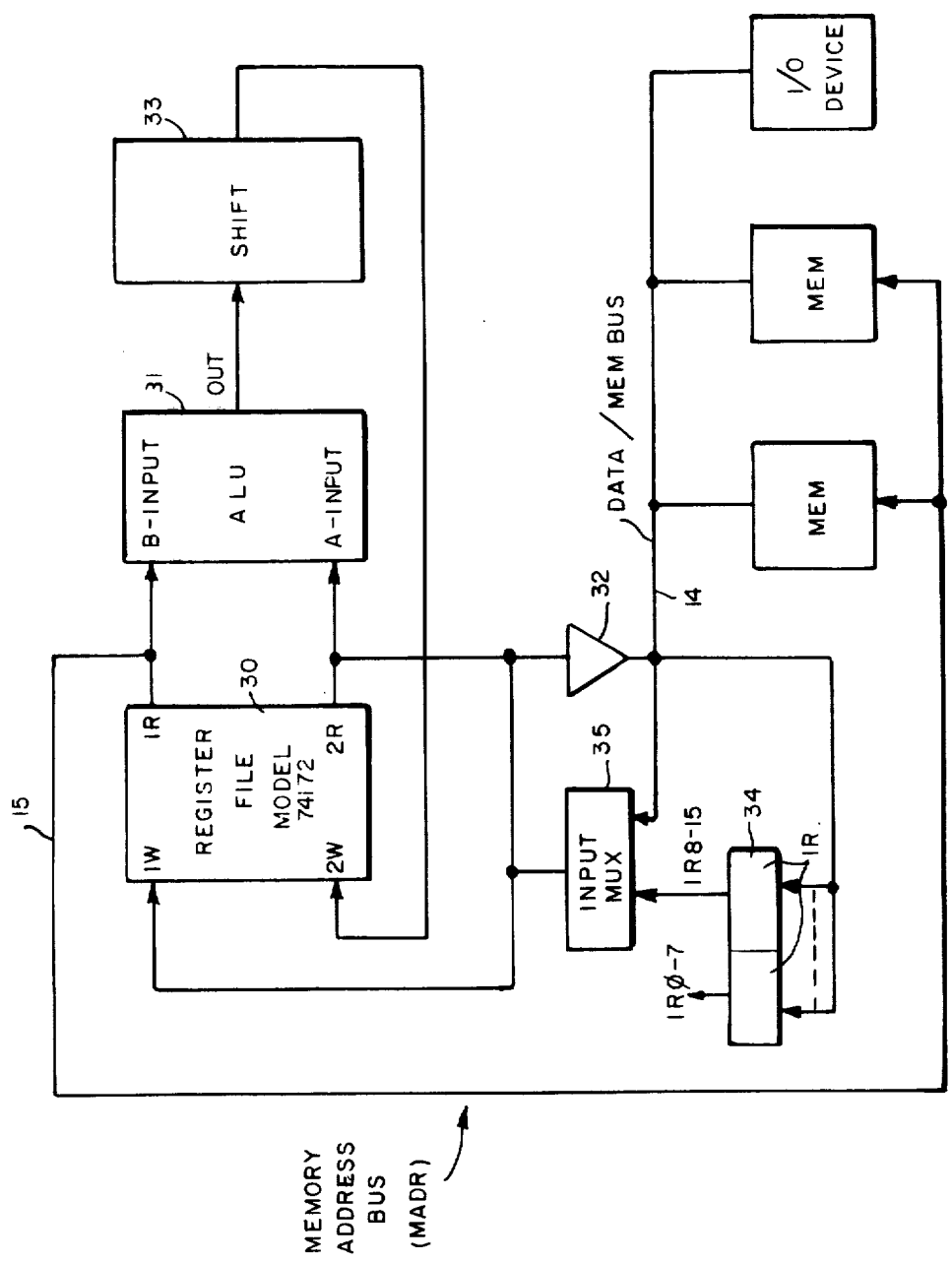

As shown in FIG. 2, a portion of the CPU includes a register file 30 which comprises either registers including the four accumulator registers discussed above (AC$\phi$, AC1, AC2 and AC3), a 15-bit program counter register (PC), a memory address register (MA), and two temporary registers for temporarily storing data (TEMP 1 and TEMP 2). It should be noted that the instruction register (IR) is not located in the register file since its contents are constantly required by the central logic and, accordingly, it is set up independently of the register file.

The register file has two write input ports (1W annd 2W) and two read output ports (1R annd 2R). To eliminate the need for an external buffer register, the register file must be skew protected, i.e., its write operation must occur on the edge of a clock pulse. With skew protection it is possible to read from and write into the same register in the same processor cycle because the actual write operation occurs at the end of the cycle. Since simultaneous read access to two registers is frequently necessary, e.g., the source accumulator and destination accumulator must both be accessed in a dual-operand arithmetic logic class instruction (ALC), the register file should have two read ports in order to avoid the need for duplicate register files. Furthermore, the dual read ports coupled with the internal addressing logic of the register file eliminate the need for multiplexer units at the read output of the register file, provided the output of the register file is either tri-state or open-collector. Since the ALU output is constrained by the instruction fetch cycle to source port 2W, this port must address the destination accumulator during arithmetic logic control execution, which operation constrains the 2R port also to address the destination accumulator. Therefore, the 1R port must address the source accumulator and must be connected to the B-input of the ALU. The arrangement in FIG. 2 is the only one which meets all of the above constraints in accordance with the invention. Accordingly, the use of dual write ports eliminates the need for multiplexers at the write input of the register file since no processor cycle occurs in which two registers are written with data from the same source.

A skew protected, tri-state, quadriport register 30 is available under the model designation No. 74172 Texas Instruments Company, Dallas, Texas, as shown in FIG. 2. In such unit ports 2R and 2W share common addressing controls. Thus, the assignment of physical ports to the data paths shown in FIG. 2 is critical if optimum operation with the operating constraints of such register is to be achieved. In addition the following constraints on the data path configuration are imposed by the instruction fetch cycle of the data processing system of the invention.

(1) A PC + 1 → PC transfer forces the write port sourced by the ALU output to address the PC;
(2) The PC → MADR transfer forces the read port sourcing the MADR bus to address the PC; and
(3) The PC → MA transfer must use the remaining read and write ports.

Since both read ports must address the PC, port 2W must also address the PC because it shares addressing control with port 2R. Further the execution of arithmetic logic control instructions imposes two additional constraints:

(4) The asymmetric nature of the ALU's function generator requires the source accumulator to be present at the B-input of the ALU;
(5) The function result must be transferred from the ALU output to the destination accumulator.

The 1R output port is fixedly connected to the B-input of an arithmetic logic unit 31 (ALU) and also to the memory address bus 15. The 2R output port is connected to the A-input of the ALU and is further connected to the 1W input and to the 1W input and to the Data/Mem bus amplifier driver unit 32. The output of the ALU is appropriately fed to a multiplexer 33 acting as a shifter, the output of which is fixedly connected to the 2W input port of the register file 30. The 1W input port is also connected to the Data/Mem bus 14 via an input multiplexer unit 35. Thus, the 1W input can be fed either from the 2R output of the register file, from an external I/O device directly, or from the memory units, depending on the operation being performed.

Figure 2C:
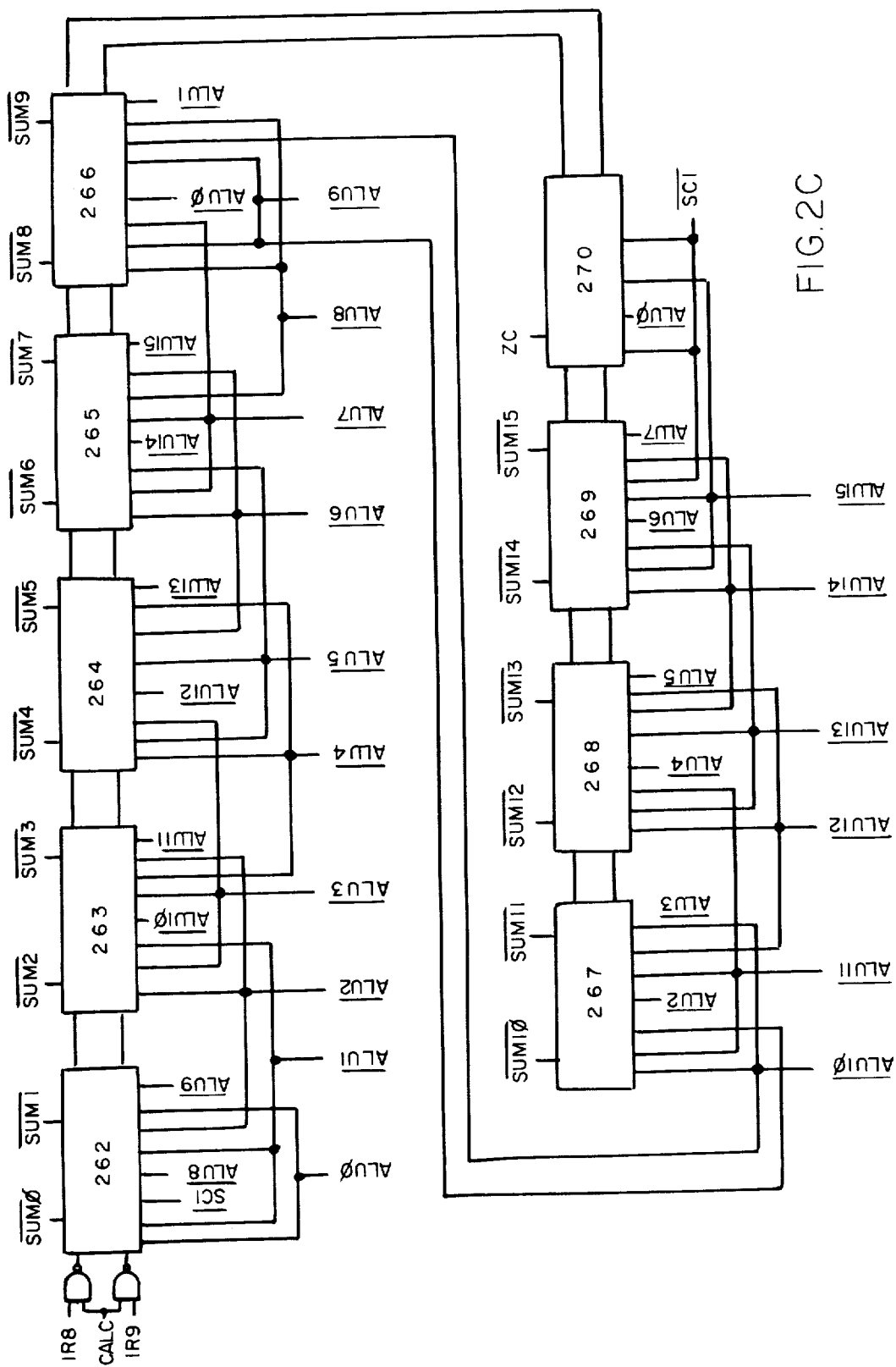

More detailed block diagrams of the register file, ALU and shifter units and their interconnections are shown in FIGS. 2A, 2B and 2C. As seen therein, when handling 16-bit words, as in the particular embodiment of the invention described here, such units preferably can be formed as appropriate integrated circuitry (IC). Thus, in FIG. 2A, eight integrated circuits of the above-mentioned model designation No. 74172, or its equivalent, can be used, each circuit handling two bits of the sixteen bits involved. Thus, eight register file IC units 250-257 are required, each having thirteen input control signals for addressing the register file and for enabling the read and write ports (the 1RADR$\phi$-2, 1WADR$\phi$-2, 2WRADR$\phi$-2 signals and the $\overline{1REN}$, $\overline{2REN}$, $\overline{1WEN}$ and $\overline{2WEN}$ signals). The read and write ports include the 1R ports (MADR$\phi$-15 outputs) connected to the memory address bus and the B-input ports of the four ALU integrated circuits of FIG. 2B, the 2R and 1W ports (CPB$\phi$-15) which are interconnected and which are further connected to the A-input ports of the ALU circuits and to the data bus driver amplifier, and the 2W ports (SUM$\phi$-15) connected to the outputs of the shifter integrated circuits of FIG. 2C. As seen in FIG. 2B, the ALU IC units each handle four bits so that the four IC units 258-261 are utilized. Such units may be the type made by Texas Instruments under model designation No. 74181, or its equivalent. As seen in FIG. 2C, the shifter IC units each handle two bits so that eight IC units 262-269 are utilized in addition to a zero-carry unit 270 as shown. Such units may be the type made by Texas Instruments under model designation No. 9309, or its equivalent.

Figure 3:
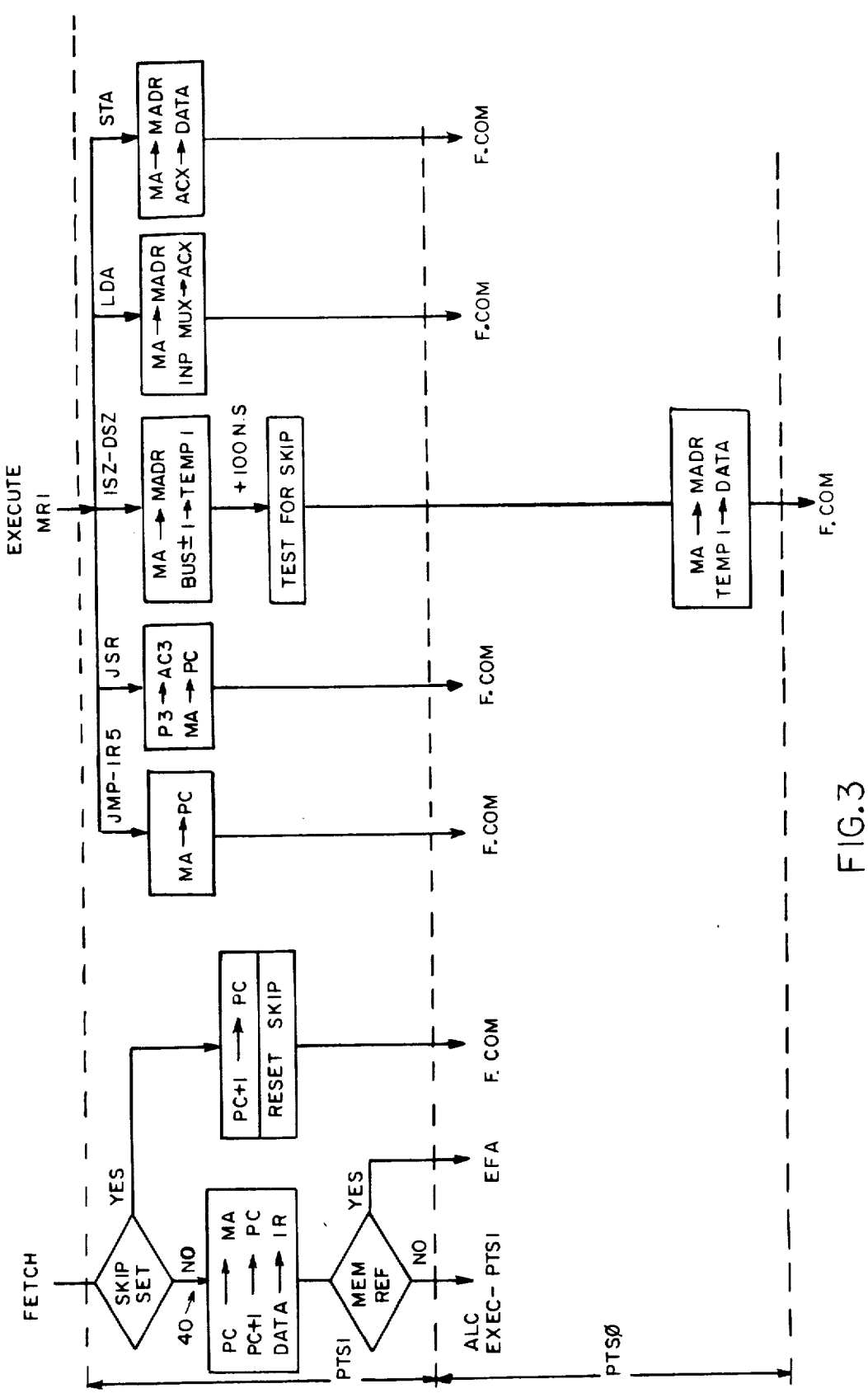
Figure 3A:
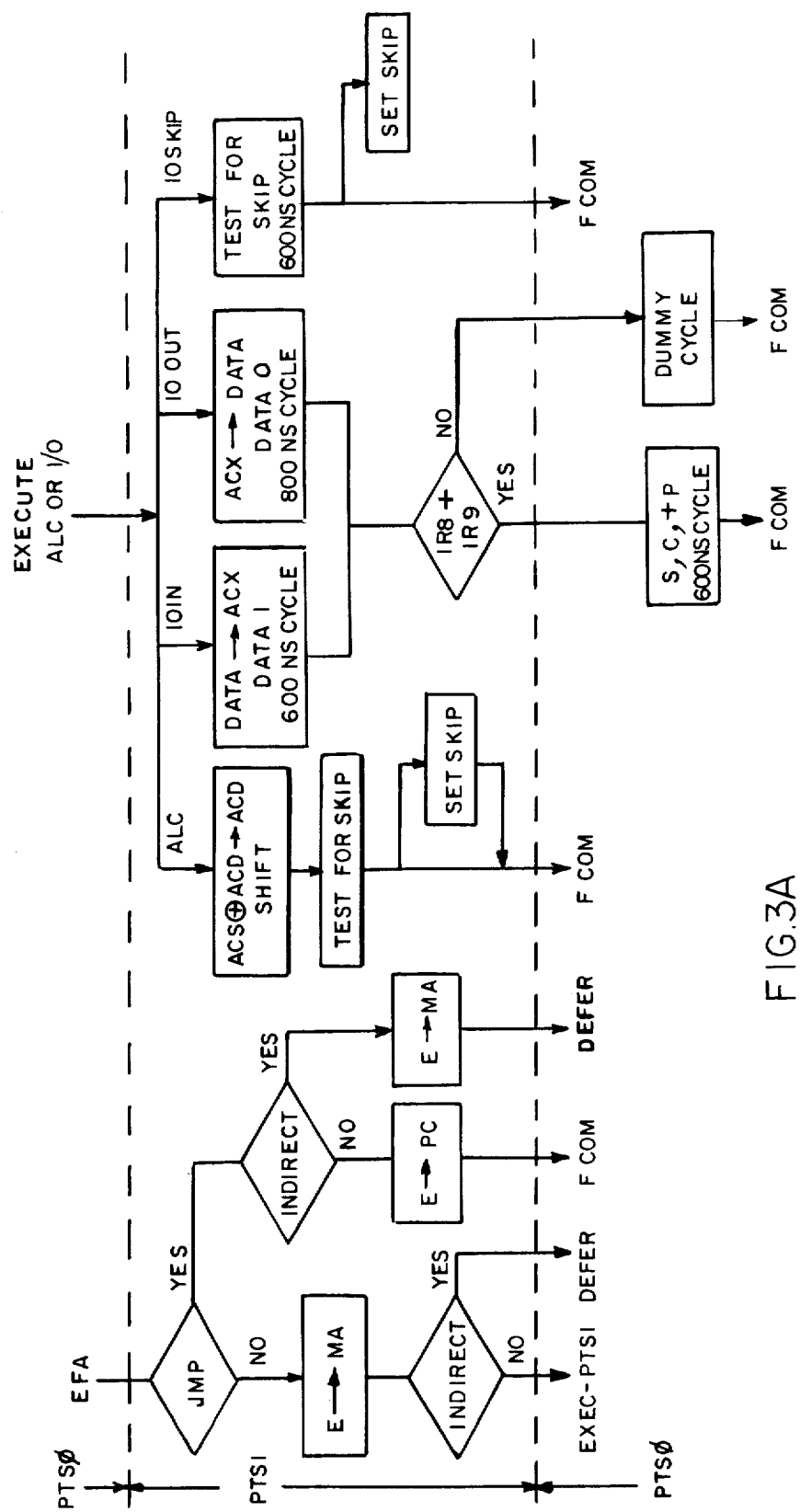
Figure 3B:
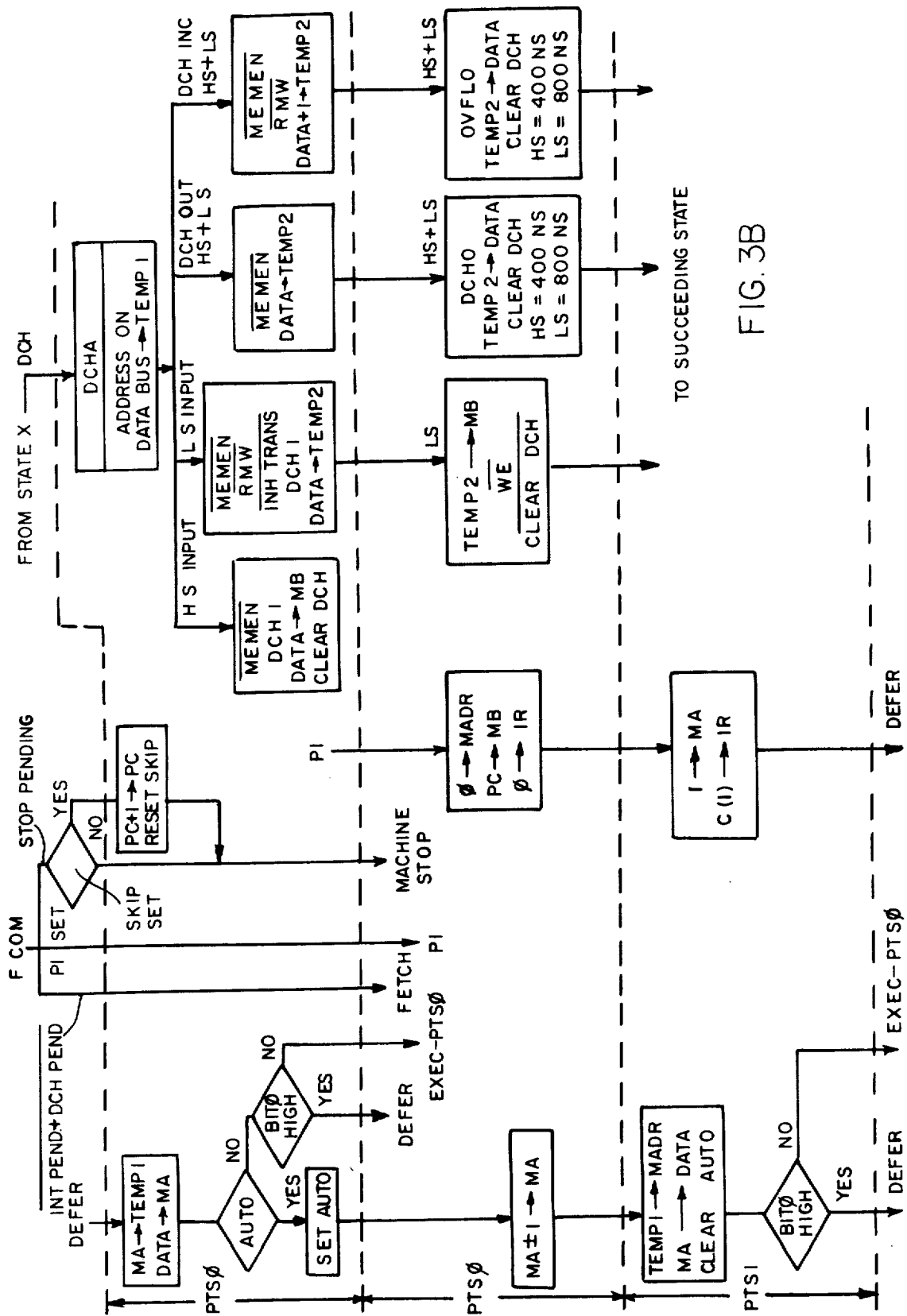
Figure 4A:
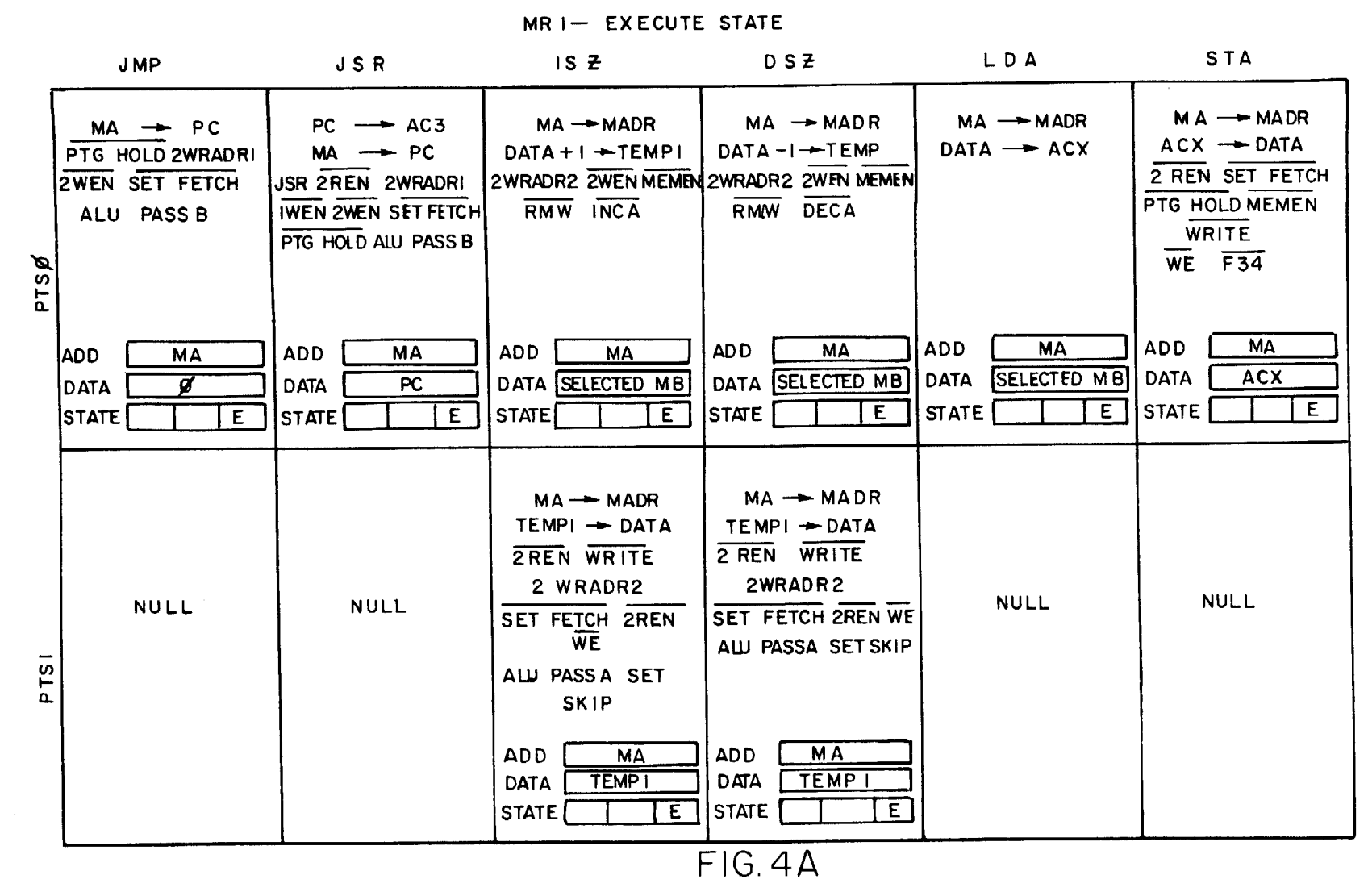

The operation of the data processing system of the invention can be explained with the assistance of FIGS. 3 and 4 which show the data processor operational flow chart and state chart, respectively. As can be seen from the latter figures, the computer, when operating in accordance with a specified program, is normally in one of a plurality of program operating states set forth under three major program operating state groups of FIGS. 4, 4A and 4B. The program operating state groups are designated "Fetch/Defer", "MRI-Execute" and "Arithmetic/IO-Execute" groups and include the states set forth in such figures.

Operation in non-program operating states can also be achieved under appropriate conditions. Thus, the programmed operation can be appropriately interrupted to permit operation with respect to an external device which is not under program control (as contrasted with peripheral (I/O) devices under program control as mentioned above) whereby data is moved to and from the data processing system and the external device being serviced thereby. Such non-program operating states are designated as Data Channel states in FIG. 4C. Further, the programmed operation of the data processing system can be interrupted by an operator via the console to provide externally controlled console operations whereby the operator may examine data at a desired location in the data processing system or may deposit switch data (i.e., by the use of appropriate combinations of switches at the console) into a desired location in the data processing system. The operator may also wish to stop and start the data processing system at the console and also cause movement of preselected program data within the system. Such non-program operating states are designated as Console states in FIG. 4D.

Each major program state group shows operation in two designated operating state levels identified for convenience as "PTS$\phi$" and "PTS1" shown in FIGS. 4-4C. The first state group, shown in FIG. 4, includes states for instruction movement, address movement and modification and program interrupt operation. Such states are designated as Fetch states (with and without a "skip" operation); Defer.$\overline{\text{Auto}}$ states; Auto Increment and Decrement states; and a Program Interrupt (PI) state, the latter being, in effect, a "fetch" type of operation. The second state group shown in FIG. 4A as Memory Reference Instruction (MRI) states, includes states for program sequence alteration, i.e., "jump" states wherein the data processor jumps to an operating state other than the next sequence in the program counter (JMP) or jumps to a particular designated subroutine (JSR), or for data movement and modification, namely, an "increment and skip, if zero," operation (ISZ); a "decrement and skip, if zero," operation (DSZ); a "load accumulator" operation for loading the contents of a specified memory location into a specified accumulator (LDA); and a "store accumulator" operation for storing the contents of a particular accumulator at a particular memory location (STA).

The third group of program operating states, shown in FIG. 4B, includes arithmetic calculations of various types (ALC), and data movement to and from peripheral input/output devices under program control (I/OIN.MNM, I/OIN.$\overline{\text{MNM}}$, I/OOUT.MNM, I/OOUT.$\overline{\text{MNM}}$ and I/OSKIP, where MNM represents a Start, Clear or Pulse condition, as in the previously known Nova operation).

Apart from the program operating states shown in FIGS. 4, 4A and 4B, the data channel states are shown in FIG. 4C for external data movement and modification with reference to external devices not under program control, such states including an initiation cycle for such data channel operation (DCH INIT), DCH input operations for both high speed and low speed devices (DCH IN), DCH output operations for both high speed and low speed devices (DCH OUT), and a DCH increment operation again for high speed and low speed devices (DCH INC). FIG. 4D shows four major console states for various console operations, such as examination and deposit of data information by an external operator at the console, address modification for such examined or deposited data, starting and stopping of the data processing system and the movement of preselected program data within the data processing system, such operations being shown as Console states CST1 through CST4.

As shown in FIGS. 4 through 4D, each of the blocks representing a particular state cycle of operation includes three types of information concerning the state in question. First of all, the particular machine operations which are provided in the state are designated (e.g., in the FETCH.SKIP state of FIG. 4 the operation: PC + 1 →PC). Secondly, the principal signals which are generated in the CPU for performing the designated operations and any notes with reference thereto are also shown (e.g., in the FETCH.SKIP state the $\overline{2REN}$, $\overline{2WEN}$, 2WRADR1, $\overline{PTG\ HOLD}$, $\overline{CLEAR\ SKIP}$ and INCA signals). Further, a designation of what is displayed at the console for each state is also shown. Thus, for the FETCH.SKIP state the console shows that the address used therein is in the PC, no data is handled, per se, in the state cycle in question and the state represents a "fetch" (F) operation.

FIGS. 3–3C are flow chart diagrams which show the flow of the computer's operation from one state to another with reference to various operating instructions of the computer. Correspondence between the operations shown in the state chart with the flow thereof in the flow chart can easily be seen. For example, for a Fetch operation of FIG. 4 either of two major flow paths are shown, one corresponding to a fetch and skip (FETCH.SKIP) operation and the other a fetch and "no skip" operation (FETCH.$\overline{\text{SKIP}}$). In the FETCH.-SKIP operation the program counter is incremented by one and the result deposited in the program counter register (PC + 1 → PC) and a reset skip operation occurs. In the no-skip operation the contents of the program counter are placed in the memory address register (PC → MA), the contents of the program counter are incremented by one and deposited back into the program counter register (PC + 1 → PC), and the data from the addressed memory is placed on the instruction register (Data → IR). At that point, when the "Fetch" operation is completed, the flow may proceed either to a Defer.Auto state if an effective memory reference must be obtained before execution (EFA→ MA) or directly to an Arithmetic Execute (ALC) state for an appropriate arithmetic calculation.

As can be seen by FIGS. 4–4D, in moving from one state to another the system will normally proceed from a PTS$\phi$ state level to a PTS1 state, and vice versa, unless a $\overline{\text{PTG HOLD}}$ signal is present, in which case the flow will proceed to a new operating state at the same state level as the previous one. For example, if the machine has completed a FETCH.$\overline{\text{SKIP}}$ cycle (in a PTS$\phi$ state level), as in FIG. 4, it must thereupon move to its next operating state cycle at a PTS1 state level since no $\overline{\text{PTG HOLD}}$ signal is present in the FETCH.$\overline{\text{SKIP}}$ cycle. However, if the machine is in a FETCH.SKIP state (at a PTS$\phi$ state level), it must thereupon move to a new state which is at the same PTS$\phi$ state level because, as can be seen in FIG. 4, a $\overline{\text{PTG HOLD}}$ signal is present.

The operation of the computer as indicated by the flow chart and state chart figures is implemented by the hardware shown and discussed with reference to FIGS. 5–20.

Figure 5:
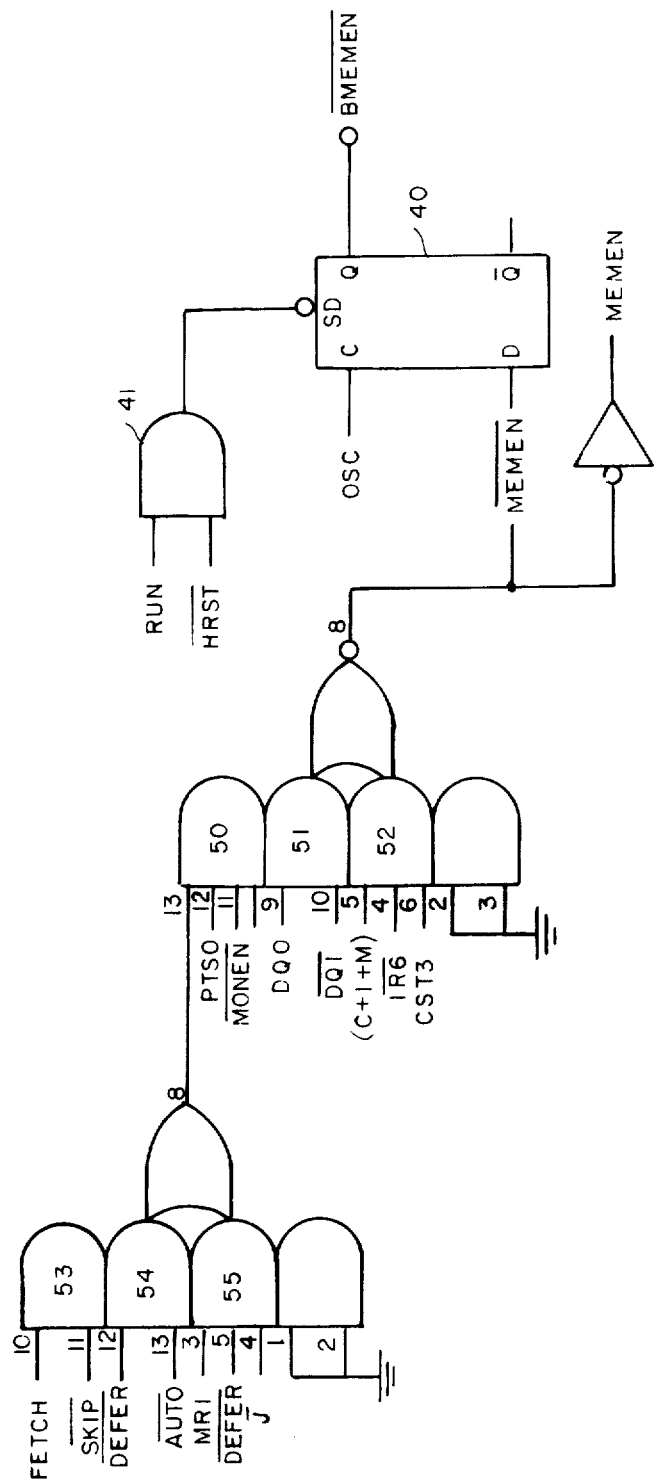
FIG. 5 shows the logic array required in the central processor unit to generate the $\overline{\text{MEMEN}}$ operating instruction signal of the invention.
Figure 6:
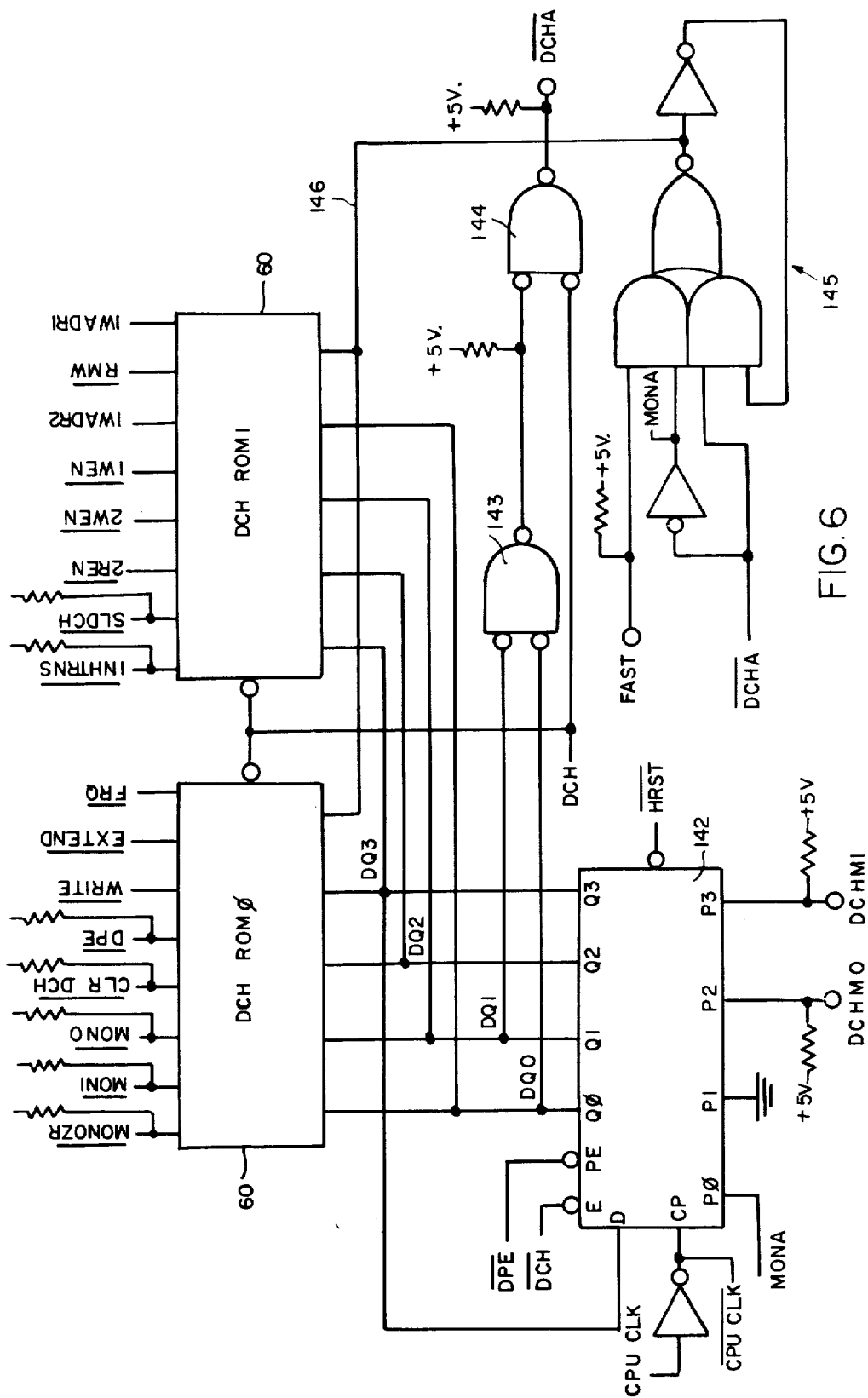
FIG. 6 shows the logic array for providing operation with reference to external data channels in accordance with the data channel states of FIG. 4C.
Figure 7:
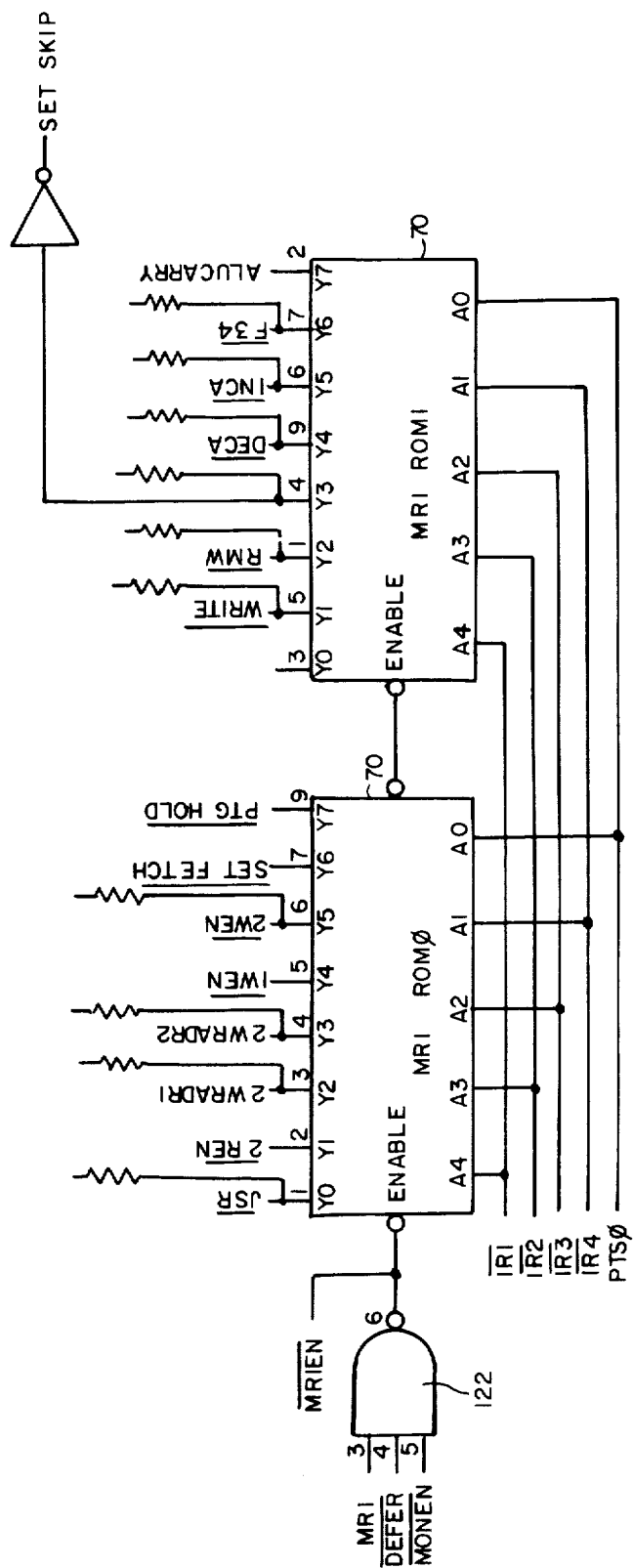
FIG. 7 shows the logic array for providing operation in accordance with the memory reference instruction program operating states of FIG. 4A.

Thus, the logic array in the CPU 10 which is utilized to generate the $\overline{\text{MEMEN}}$ signal, ultimately transferred from the CPU to the memory unit as the $\overline{\text{BMEMEN}}$ signal, is shown in FIG. 5 and described in more detail below. The read-only-memory units 60 and logic used therewith for generating the signals required for operation in the data channel states of FIG. 4C are depicted in FIG. 6, while FIG. 7 shows the read-only-memory units 70 and input logic used for generating the signals required for operation in the MRI-EXECUTE states of FIG. 4A.

Figure 8:
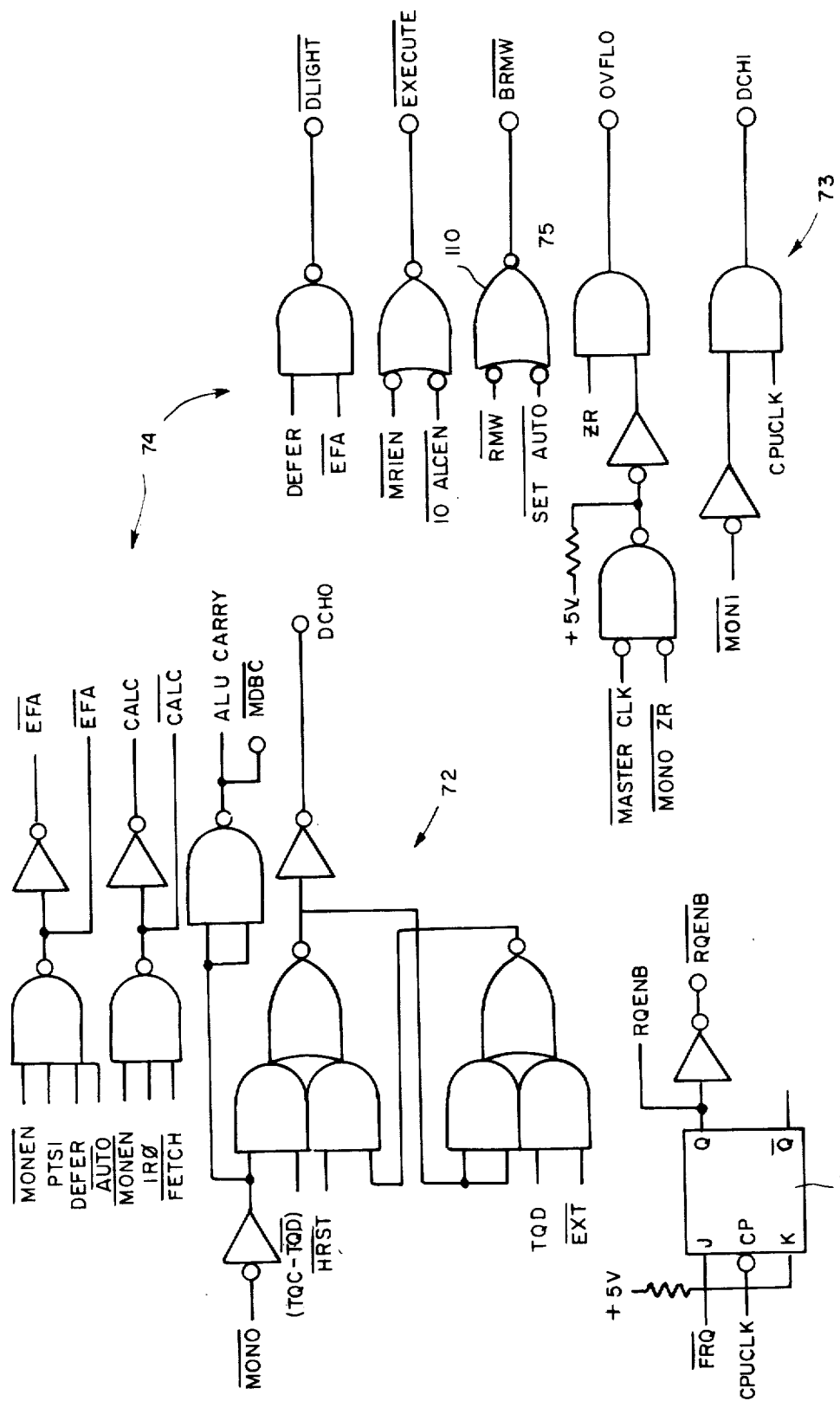

The logic arrays 72 and 73 in FIGS. 8 and 8A provide the DCHO and DCHI signals supplied to the external data channel devices for controlling the input and output operations thereof. Additional logic 74 is shown therein for producing various control signals used internally within the central processor unit and for producing signals to operate the console lights to indicate operation in the defer or execute program states (DLIGHT and $\overline{\text{EXEUTE}}$). The buffer logic 75 generates the read-modify-write signal transferred to the memory unit from the CPU as the $\overline{\text{BRMW}}$ signal. Further, control of input/output operation is provided by J-K flip-flop 76 which provides the $\overline{\text{RQENB}}$ signal for synchronizing computer operation with respect to requests for external data channel cycles or interrupt cycles, in a manner well known with reference to previously available Nova computers.

Figure 9:
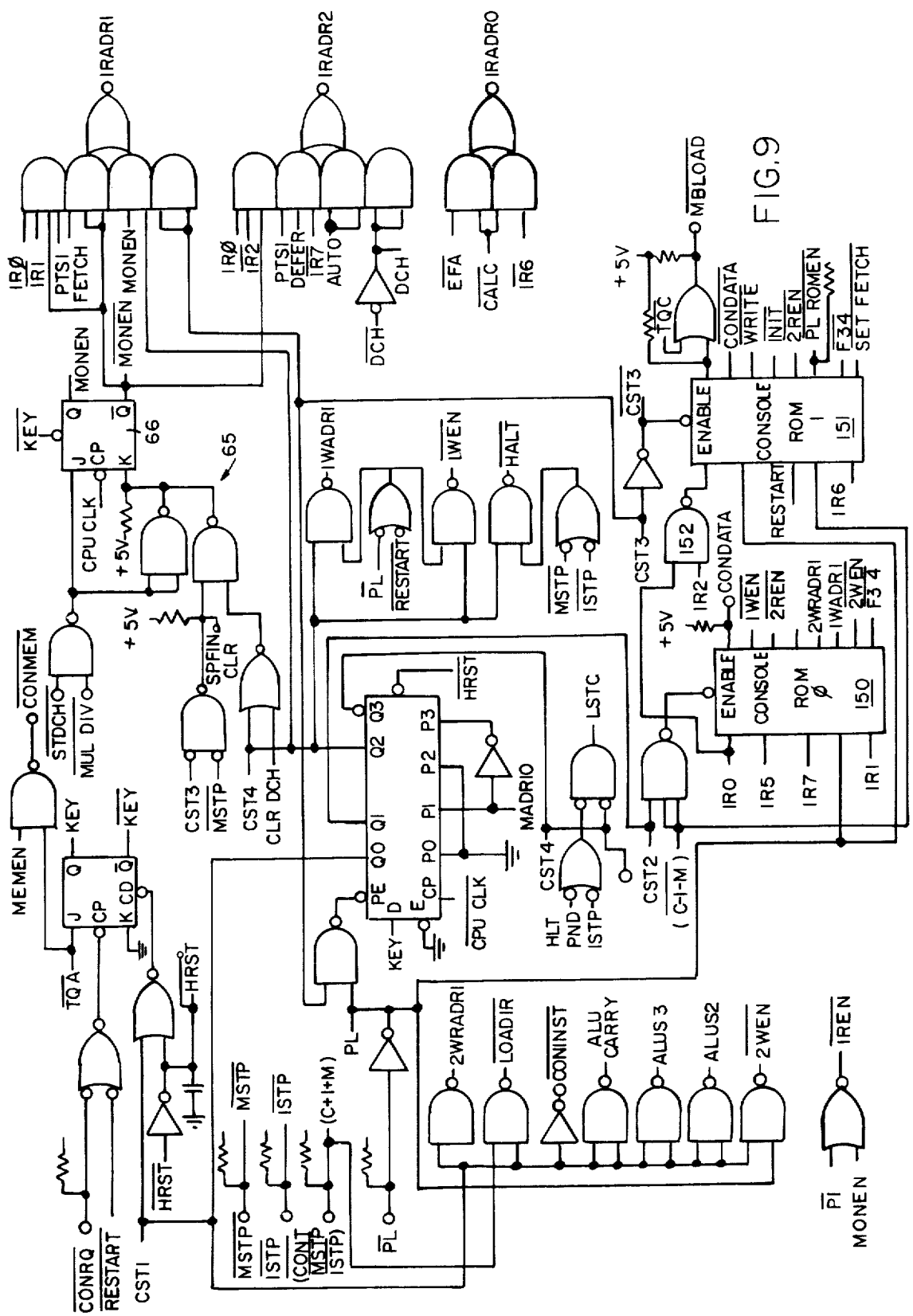
FIG. 9 shows miscellaneous logic arrays for providing various signals used in the operation of the data processing system of the invention, including the logic for providing operation in accordance with the console states of FIG. 4D.

FIG. 9 depicts logic for control of the data paths of FIG. 2 and, particularly, for control of the operation of the 1R port of the register file 30 therein (i.e., the 1R address signals 1RADR0, 1RADR1 and 1RADR2). Further, FIG. 9 depicts logic 65 including J-K flip-flop 66 for providing a MOMEN signal to indicate that the computer is not operating in one of its normal program operating states but rather is operating in a non-program mode, e.g., a data channel or console mode with reference to the operating states shown in FIGS. 4C and 4D. FIG. 9 also shows the read-only-memory units 150 and 151 and the input logic therefor for generating the signals required for operation in the console states of FIG. 4D.

Figure 10:
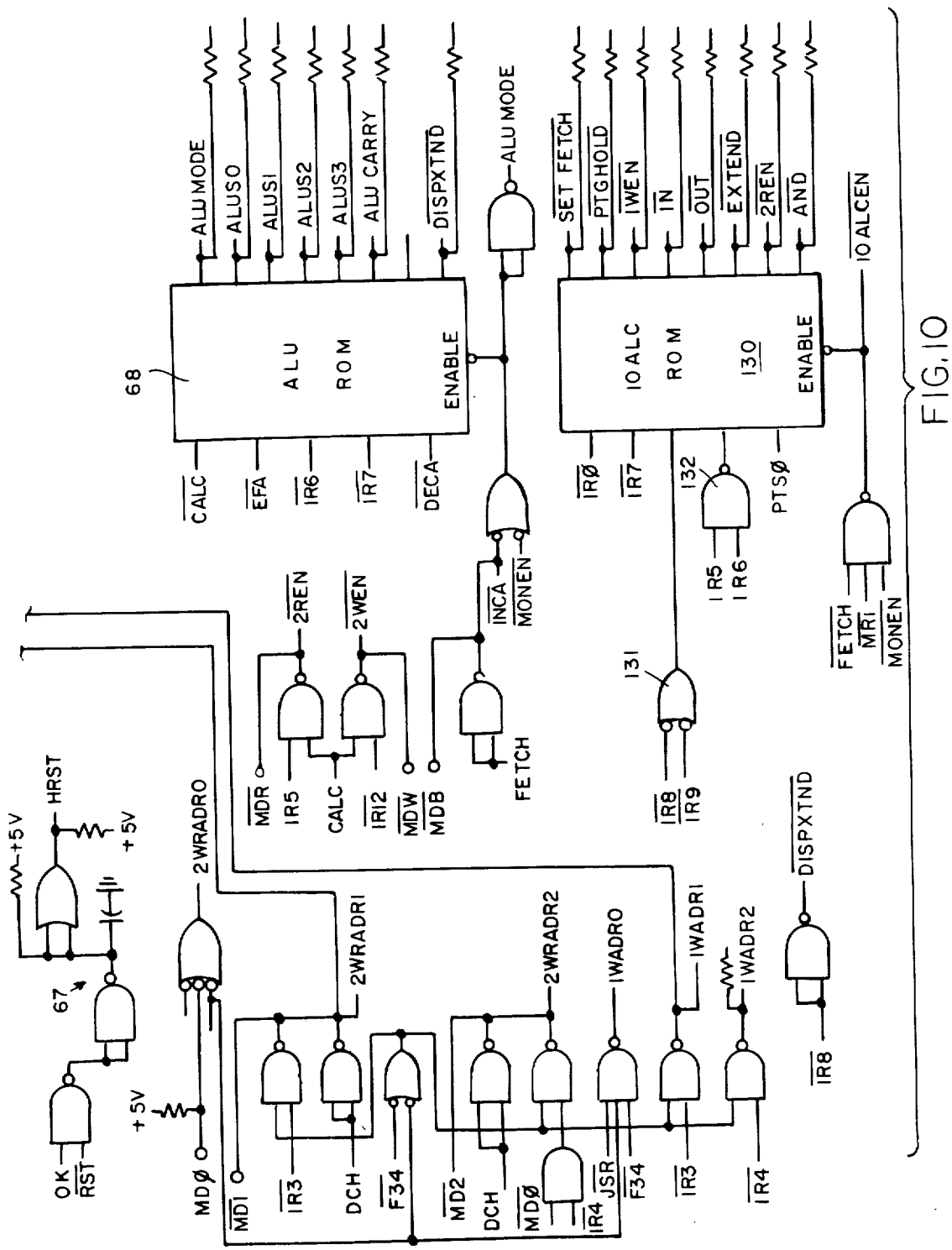
FIG. 10 shows miscellaneous logic arrays for providing various signals used in the operation of the data processing system of the invention, including the logic for providing operation in accordance with the arithmetic and input/output states of FIG. 4B.

The read-only-memory unit and input logic for generating the signals required for operation in the arithmetic/input-output states of FIG. 4B are depicted in FIG. 10 by IOALC ROM unit 130 having inputs controlled by certain data bits of the instruction register (i.e., IR bits $\phi$ and 5–9) to produce the signals required for operation in the input-output or arithmetic states desired.

The read-only-memory unit for controlling operation of arithmetic logic unit 31 of FIG. 2 (ALU ROM unit 68) is also shown in FIG. 9, such ROM being responsive to the signals shown to generate the desired ALU control signals for such purpose. Other logic circuits are also shown in FIG. 9 primarily for controlling the 1W, 2W and 2R ports of the register file 30 of FIG. 2. Further, logic circuitry 67 for the generation of the reset signal HRST is also depicted therein.

Figure 11:
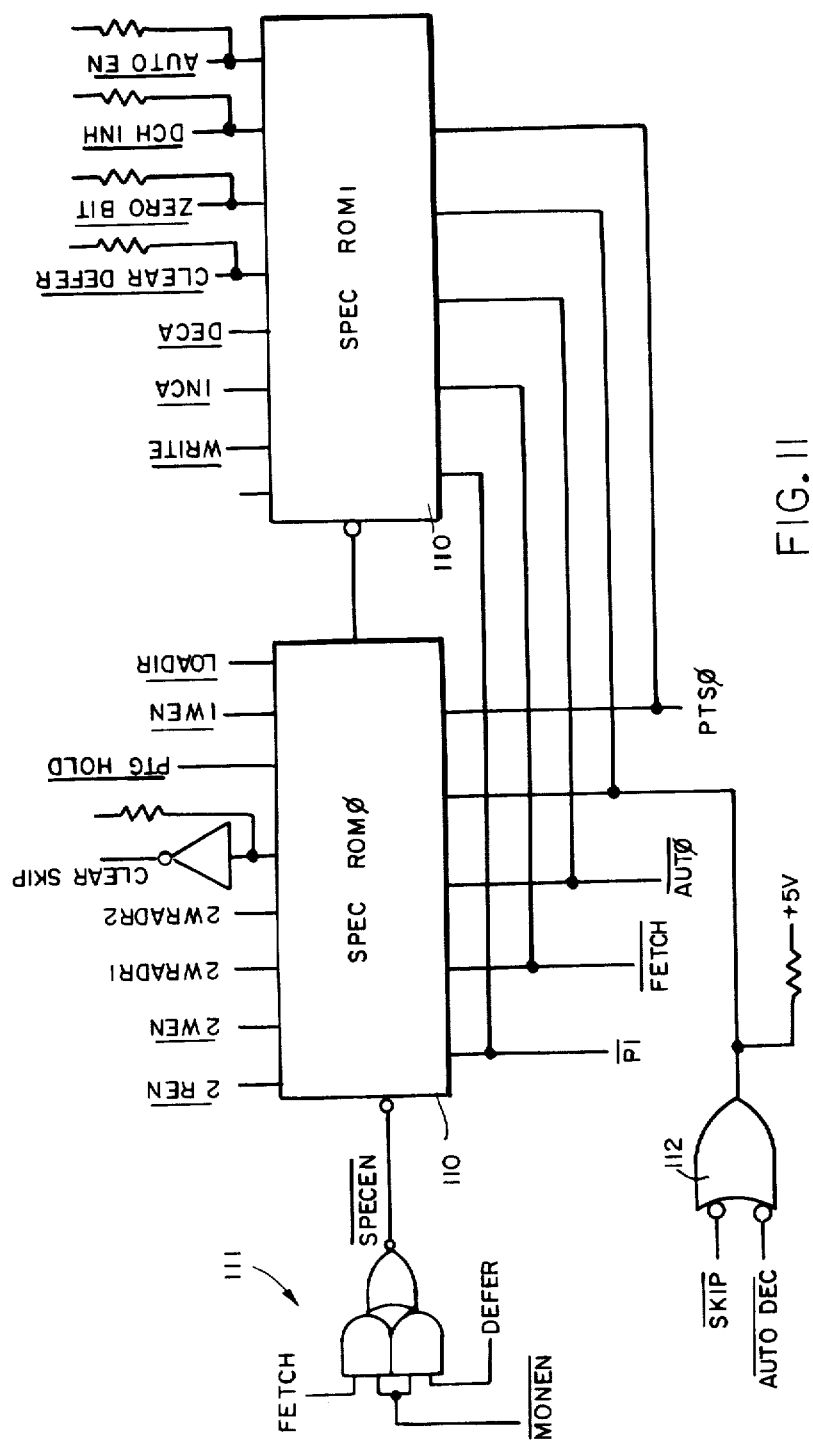
FIG. 11 shows the logic array for providing operation in accordance with the fetch/defer states of FIG. 4.

The read-only-memories utilized in conjunction with the generation of signals for providing the fetch/defer program operating states of FIG. 4 are shown in FIG. 11 as SPEC ROM units 110, such ROM's being enabled by a $\overline{\text{SPECEN}}$ signal in the manner shown by logic units 111.

Figure 12:
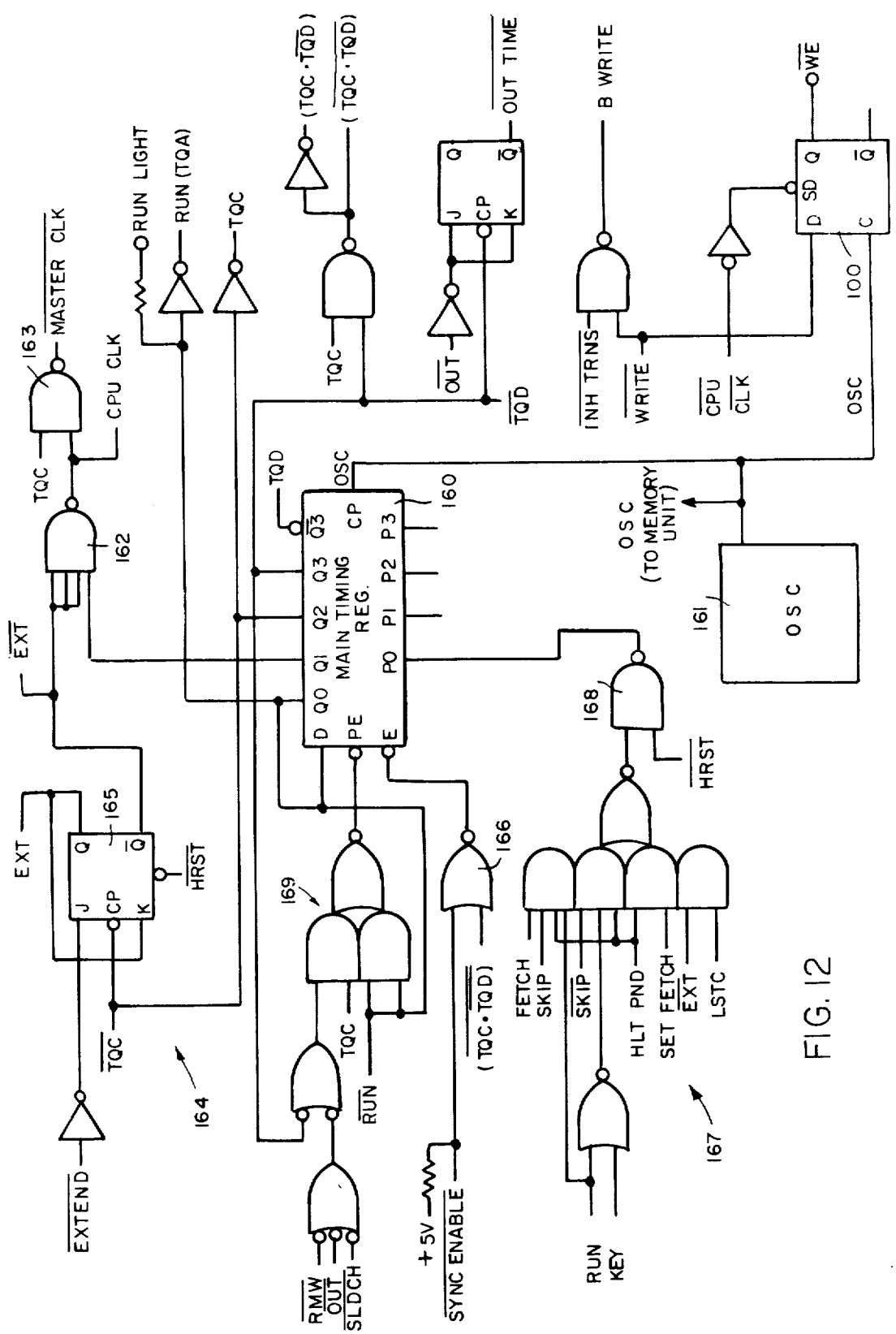
FIG. 12 shows the logic arrays for providing the principal timing signals in the central processor unit of the data processing system of the invention.

The basic timing system for the computer is shown by the timing logic of the CPU as depicted in FIG. 12 and includes the main timing register 160 which is controlled by the output of oscillator 161 to produce a primary CPU timing or clock signal (CPUCLK) shown at the output of AND logic unit 162. The period of the CPUCLK signal is essentially determined by the oscillation signal OSC at the CP terminal of the main timing register 160 unless such period is extended by the "extend" logic 164 as discussed below. All state changes in the apparatus occur on the downgoing side of the CPUCLK signal. A $\overline{\text{MASTER CLK}}$ signal is derived from the CPUCLK signal and the TQC signal from the main timing register 180 via AND logic unit 163, the $\overline{\text{MASTER CLK}}$ signal being used to clock the register file 30 of FIG. 2.

Figure 12A:
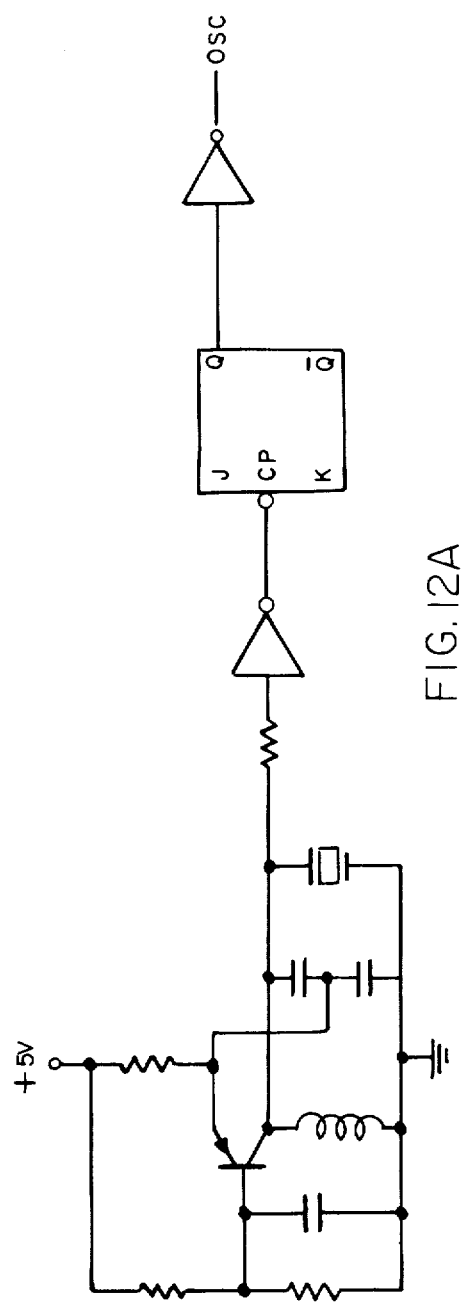
FIG. 12A shows a specific implementation of the oscillator depicted in FIG. 12.

Oscillator 161 is shown in more detail in FIG. 12A and produces an oscillator pulse waveform which, as shown in FIG. 12, is supplied to the CP terminal of the main timing register 160. The oscillator signal is also supplied to the memory unit, as shown in FIG. 18. At the memory unit the inverse of the OSC signal (i.e., the MEMCLK signal) is supplied via inverter circuit 189 to the CP terminal of the memory timing register 190.

In operation, then, the oscillator output controls the phase relationship between the CPUCLK signal obtained at the main timing register 160 and MEMCLK signal which controls the memory timing signals MTG $\phi$-3 at the memory timing register 190 which signals in turn control the timing of the memory unit. Accordingly, a predetermined phase relationship exists between the CPU and the memory timing signals and the desired sequencing of the operation of the CPU and the memory unit is achieved in a simpler, less expensive and more reliable manner than in previously available asynchronous systems.

The logic units 164, including J-K flip-flop 165, control the manner in which the timing of the CPU state operating cycle can be modified, for example, to increase the normal cycle period. Thus, when the $\overline{\text{EXTEND}}$ signal goes low the operation of the J-K flip-flop unit 165 provides an $\overline{\text{EXT}}$ output signal, which signal prevents the CPUCLK signal from going low until the end of the $\overline{\text{EXTEND}}$ cycle period. As can be seen further in FIG. 12, the $\overline{\text{SYNC ENABLE}}$ signal, when present, prevents the generation of the CPUCLK signal when the output of the $\overline{\text{SYNC ENABLE}}$ logic OR unit 166 at the E terminal of the main timing register 160 is high (i.e., the CPU is then effectively placed in a non-operating state). Thus, the CPU remains operative even when the memory unit is operative so long as the $\overline{\text{SYNC ENABLE}}$ signal is not present and the CPU suspends its operation only when determined by the need for such suspension as indicated by the memory unit via the generation at the memory unit of the $\overline{\text{SYNC ENABLE}}$ signal as shown and discussed with reference to FIG. 18C.

Figure 13:
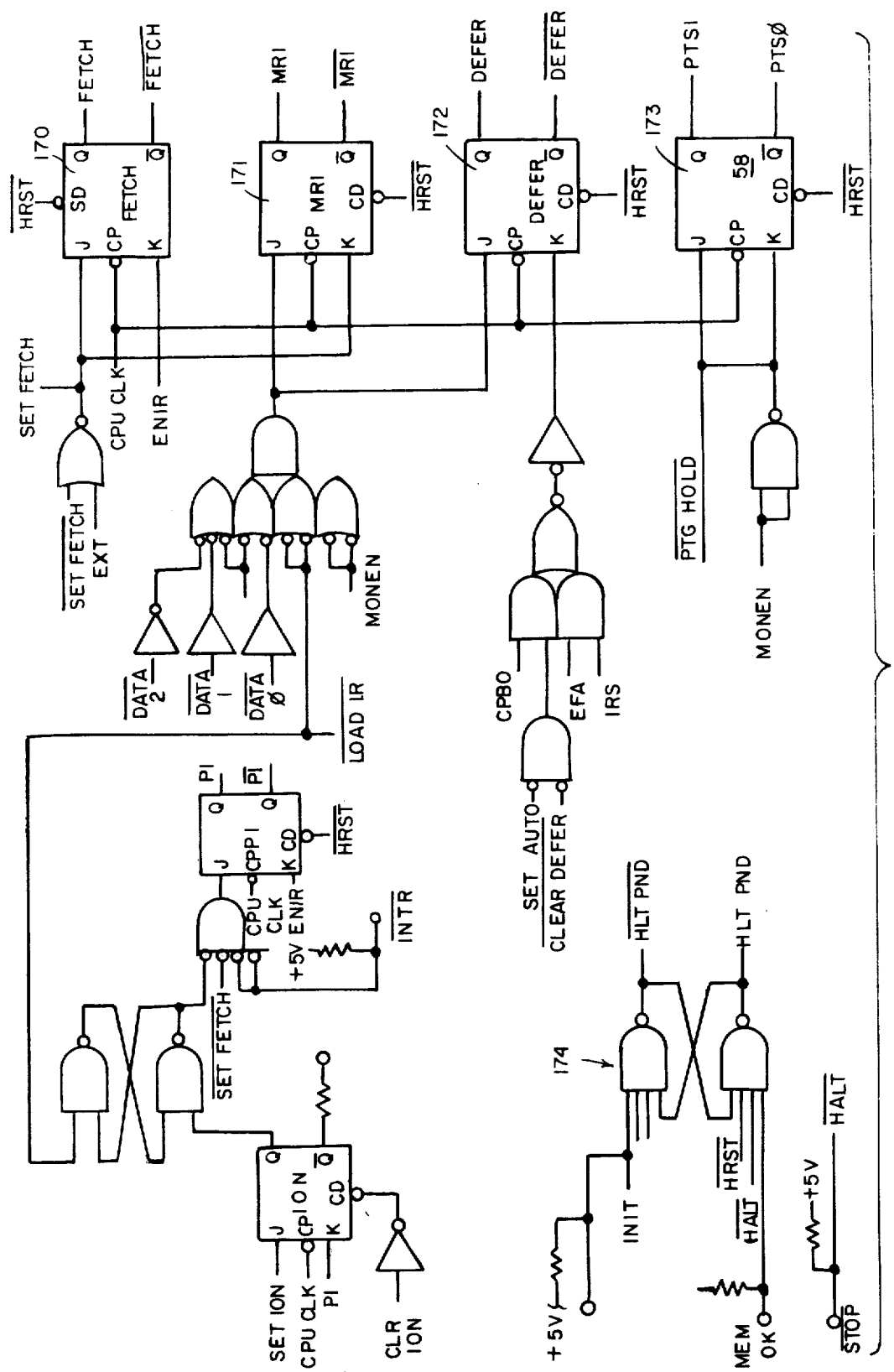
FIG. 13 shows miscellaneous logic arrays for providing various state control operating signals used in the central processor unit of the data processing system of the invention.
Figure 14:
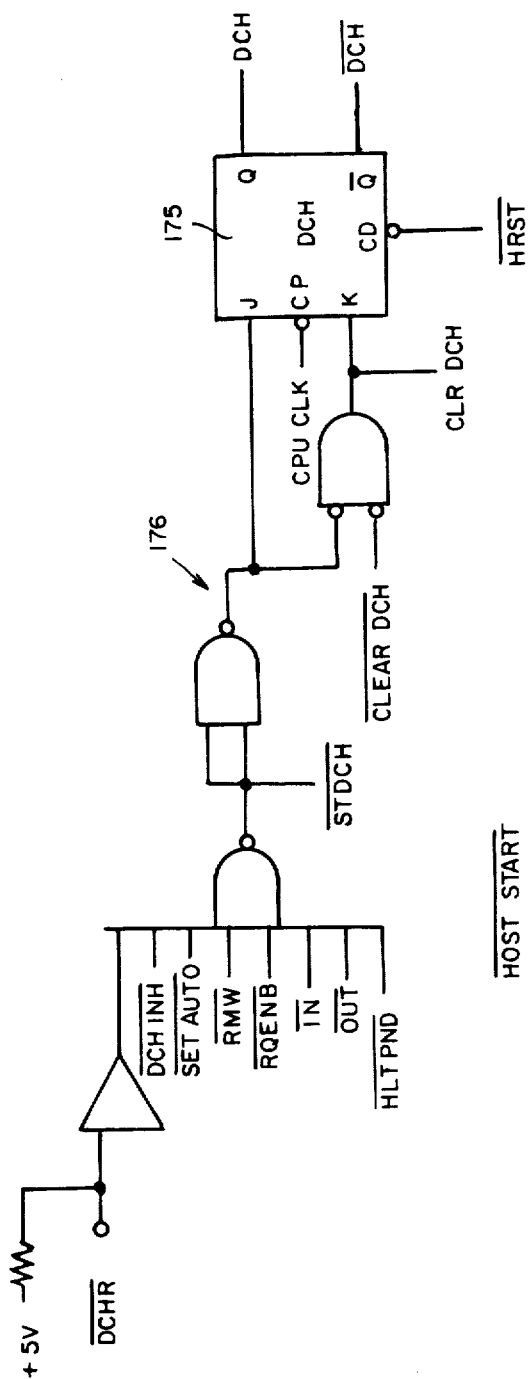
FIG. 14 shows the logic array for providing the control enable signal for external data channel operation.
Figure 14A:
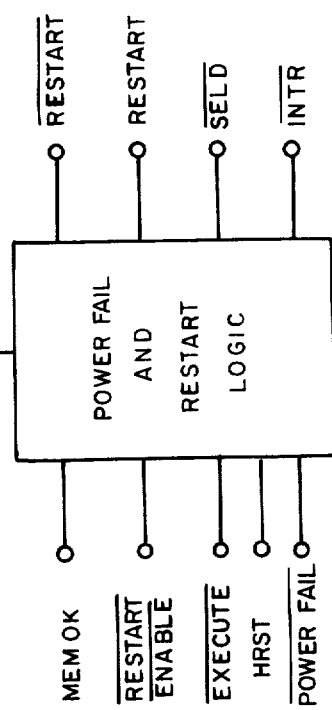
FIG. 14A shows a block diagram of the power fail and restart logic used in the data processing system of the invention.
Figure 14B:
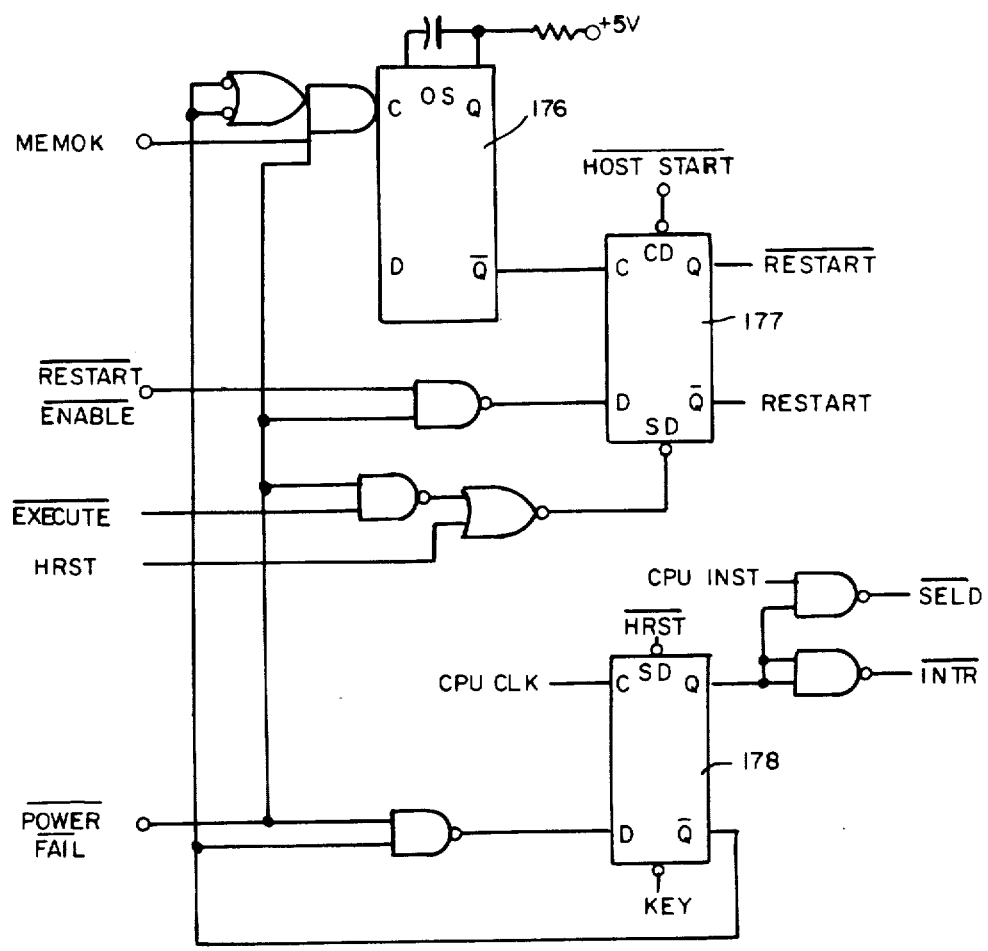
FIGS. 14B shows a specific implementation of the logic of FIG. 14A.

Further, logic for temporarily halting operation of the CPU is shown by logic units 167. When the signal at the output of logic AND unit 168 fed to the PO input of the main timing register 160 is high, the CPU effectively halts its operation at the next oscillator cycle. Further, at the PE input to the main timing register 160 a provision is made via logic units 169 for providing either a 300 nanosec. or 400 nanosec. recycle time depending on the presence of a read-modify-write signal (RMW), a signal indicating a transfer of data from an accumulator to an I/O device under program control ($\overline{\text{OUT}}$), or a signal indicating that operation with reference to an external data channel is desired at 400 nanosec. rather than at 300 nanosec. ($\overline{\text{SLDCH}}$). Thus, for example, a read-modify-write operation requires a 400 nanosec. time period for completion and the timing cycle is temporarily extended during such operation to permit its completion before the next operation. A plurality of J-K flip-flop units 170-173 are shown in FIG. 13 together with the appropriate input logic array therefor to produce the major state operating signals for the FETCH, DEFER and MRI states of FIGS. 4 and 4A and for determining the state level (i.e., PTS$\phi$ or PTS1) of operation. Further flip-flop circuitry 174 is shown in FIG. 13 to indicate that at the end of the next instruction the machine will be halted as shown by the HLTPND (halt pending) signal produced at the output thereof. The flip-flop unit for controlling the state for external data channel operation is shown in FIG. 14 by DCH flip-flop 175 and the input logic 176 thereto for such purpose. FIG. 14A shows in simple block diagram form the signals required to provide appropriate power fail and restart operation. Such logic is essentially similar to that presently available in the Nova 800 and Nova 1200 minicomputers being manufactured and sold by Data General Corporation. The appropriate circuitry therefor is shown in FIG. 14B utilizing the necessary flip-flop units 176, 177 and 178 and the appropriate logic in connection therewith.

Figure 15B:
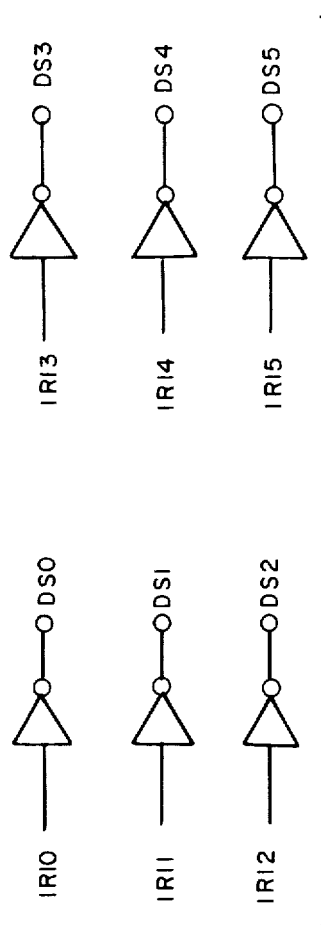
FIGS. 15A and 15B show the specific implementation of the input-output processing and device selection logic of FIG. 15.
Figure 15:
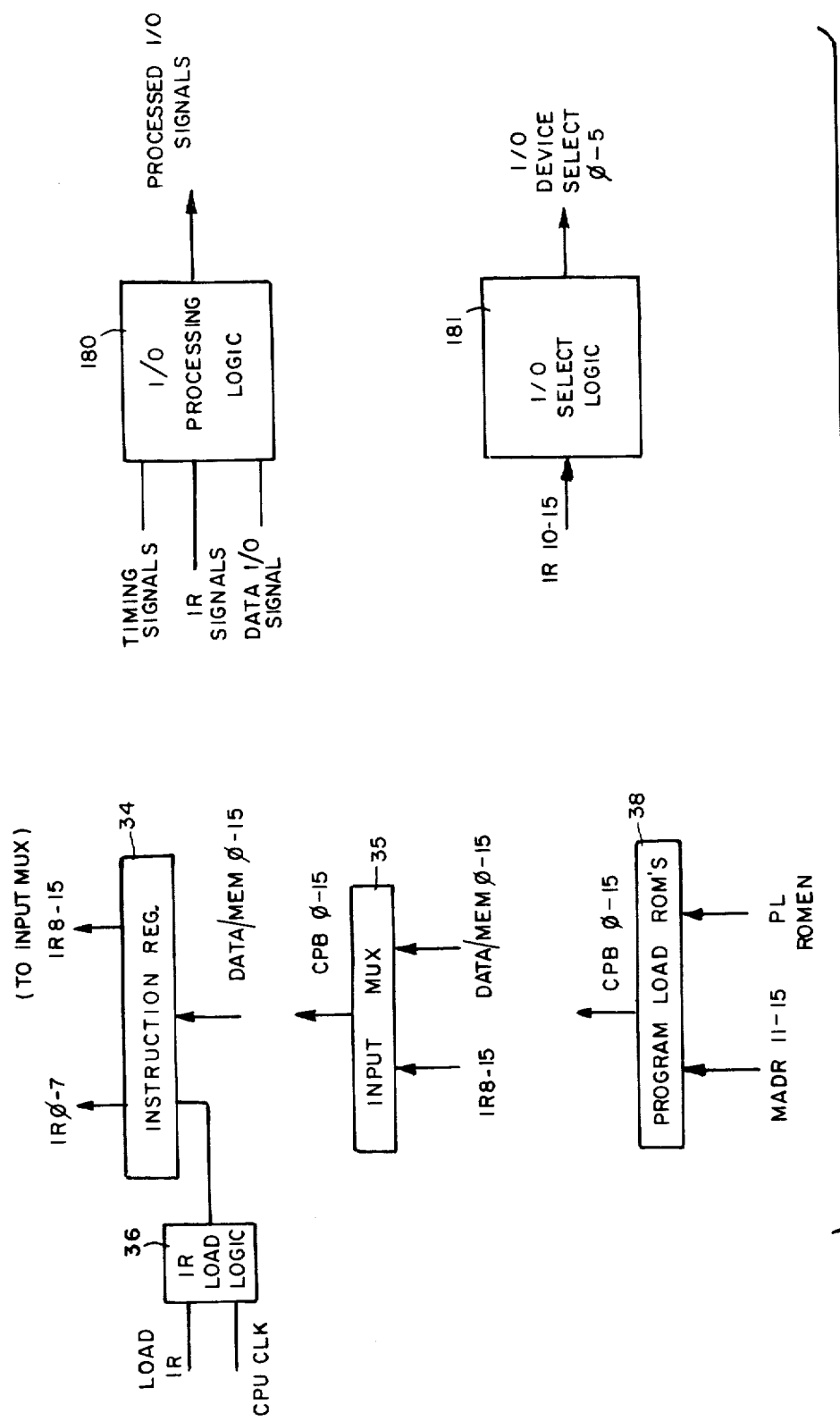
FIG. 15 shows in block diagram form the inputs and outputs of various interconnection elements of the central processor unit including the instruction register and IR load logic, the central processor buffer input multiplexer and the program load read-only-memory units.

FIG. 15 shows the relationships among various input and output signals at various operating units in the central processor unit of the apparatus. Thus, the instruction register 34 is appropriately enabled through IR load logic 36 to permit loading thereof with data from the Data/Mem bus (Data/Mem bits $\phi$-15) to provide the output IR bits $\phi$-15 which are effectively available as two groups, or bytes, represented as an upper byte including IR bits $\phi$-7 and a lower byte including IR bits 8-15, the latter byte as mentioned above being fed to the input multiplexer 35 of FIG. 2. The input multiplexer 35 is fed not only by the lower byte of the instruction register but also from the Data/Mem bus as depicted in FIG. 15 by Data bits $\phi$-15. The program load read-only-memories 38 are enabled by an appropriate program load enable signal (PLROMEN) so that the desired program load output bits (CPB $\phi$-15) are utilized in accordance with a suitable combination of memory address bits (MADR 11-15).

Figure 15A:
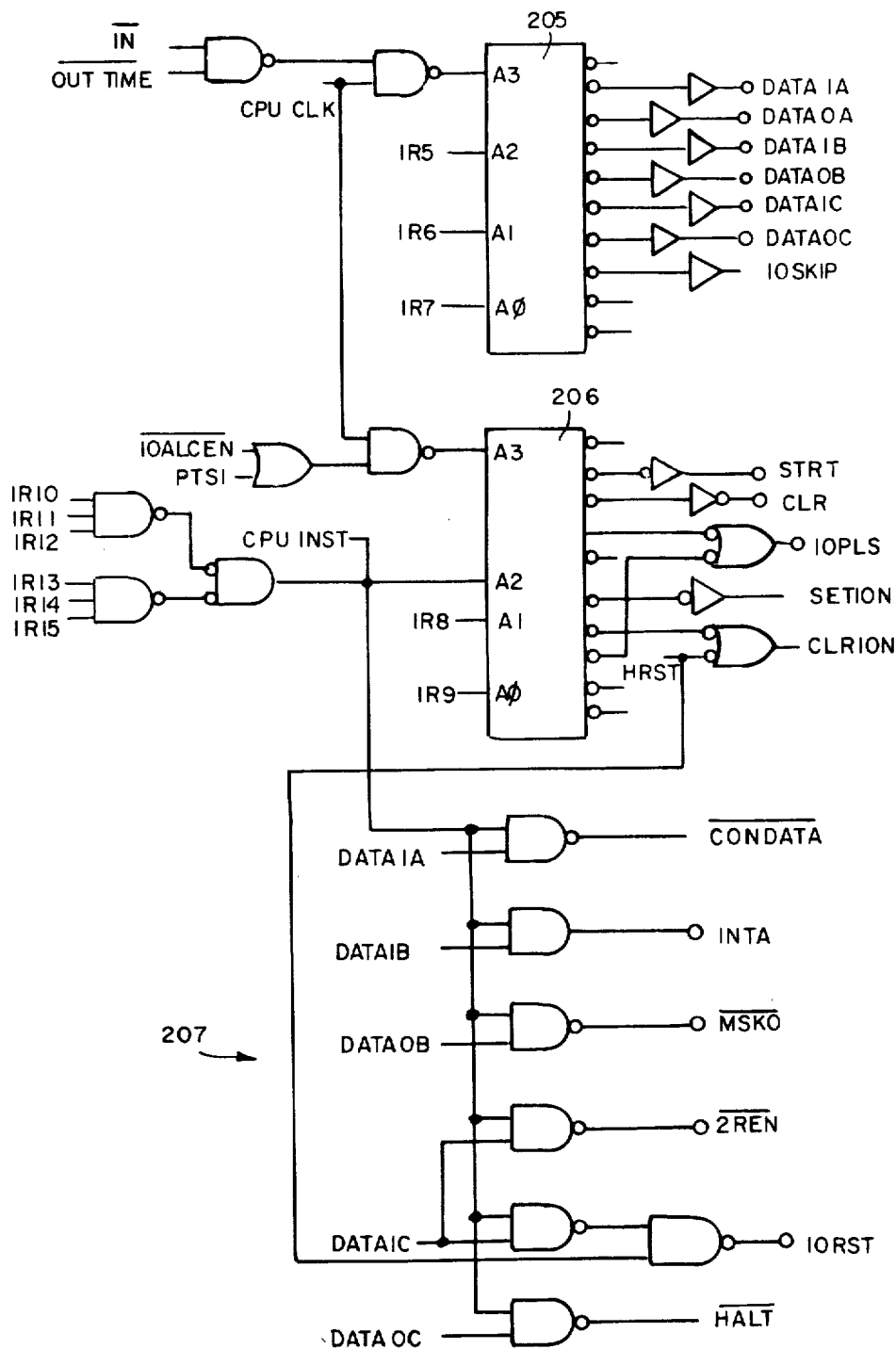

Appropriate input/output processing logic 180 and input/output select logic 181 is also utilized as shown in simple block diagram form, the processing logic utilizing appropriate IR bit signals, data I/O signals and a suitable timing signal to produce processed I/O signals. One embodiment of such logic is shown in FIGS. 15A and 15B. The processing logic of FIG. 15A utilizes suitable registers 205 and 206, the timing signals being logically combined and applied to the A3 inputs thereof and the appropriate combination of IR bits 8-15 being applied as shown to the A$\phi$, A1 and A2 inputs to produce the signals shown for operation with the external devices as required. The logic 207 utilizes the data operational instruction signals from register 205 to produce the output processing signals required. The select logic shown in FIG. 15B can be embodied as a plurality of inverter circuits to produce operating signals $\overline{\text{DS}\phi}$ through $\overline{\text{DS5}}$ as determined by IR bits 10-15.

Figure 16:
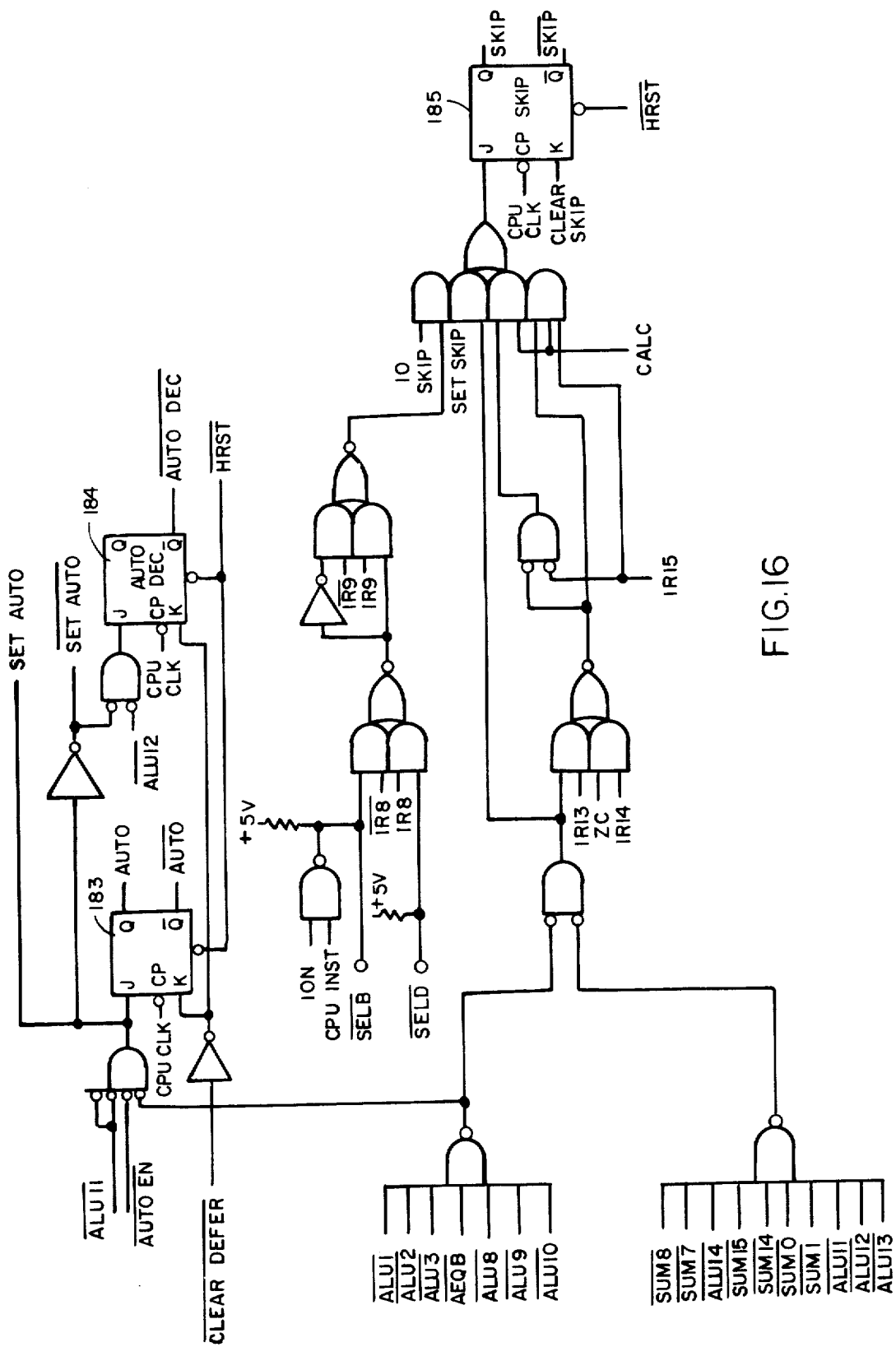
FIG. 16 shows the logic array for control of the "auto" and skip operations of the data processing system of the invention.
Figure 17:
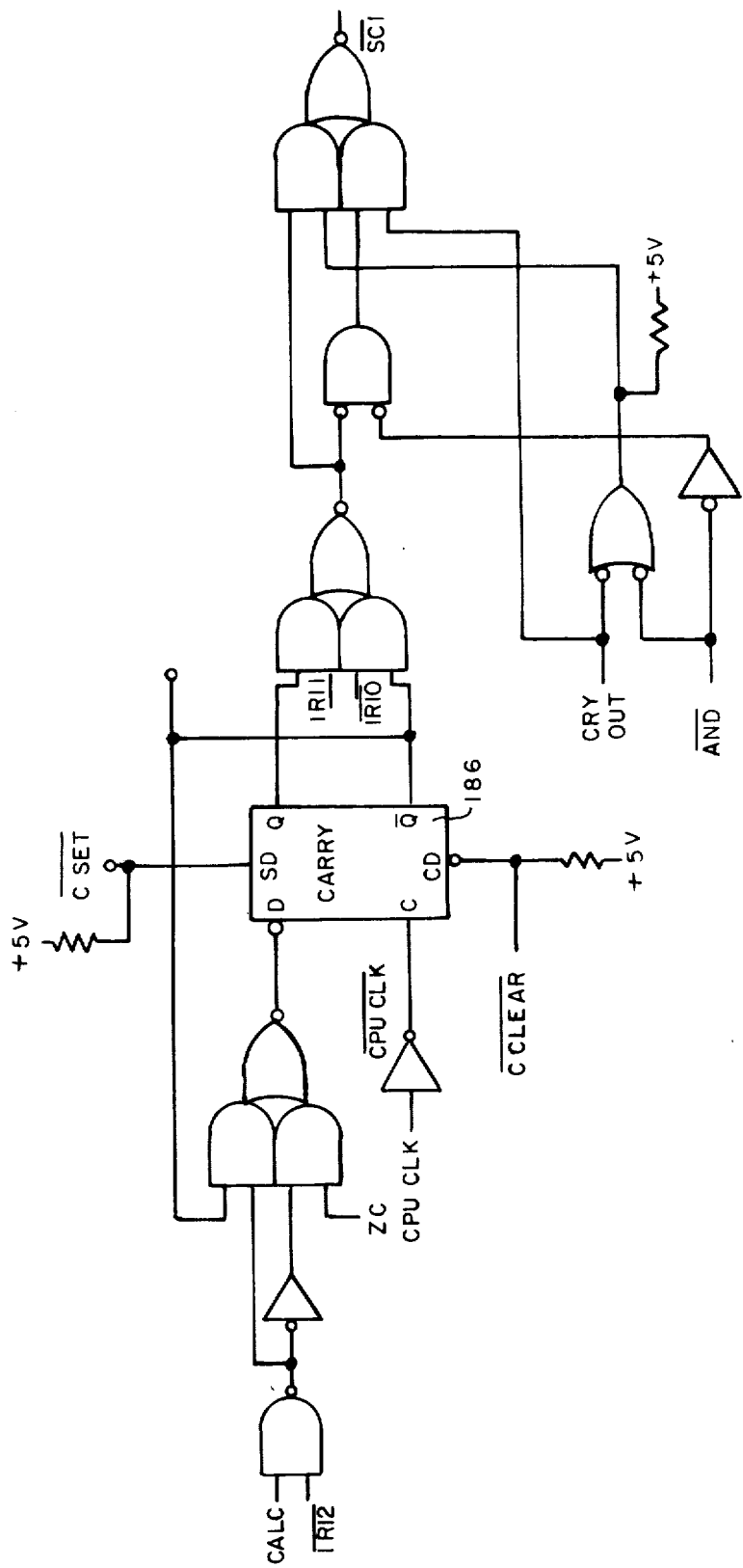
FIG. 17 shows the logic array for control of the carry operation of the data processing system of the invention.

The Auto Increment/Decrement flip-flop units 183 and 184 and the Skip flip-flop unit 185 are shown in FIG. 16 together with the input logic required for their control. Further, the Carry D flip-flop unit 186 and the logic utilized therewith is shown in FIG. 17 for producing the appropriately desired shift carry input signal (SCI), all in a manner essentially already known with reference to previous Nova computer operation.

Figure 18D:
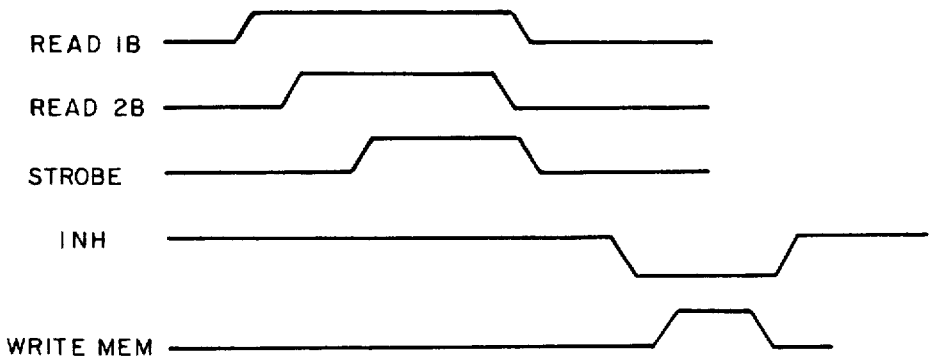
FIG. 18D shows a timing diagram relating the signals produced in the logic array of FIG. 18.

The timing logic utilized in the memory unit of the apparatus is shown in FIG. 18, the primary memory timing register 190 producing the appropriate memory time gate signals MTG$\phi$-3 which control the memory logic to produce the desired write, read, inhibit and strobe signals for the memory devices thereof, the timing relationship among such signals being shown in FIG. 18D. As mentioned above, the memory timing signals are controlled by the MEMCLK signal at the CP input of the memory timing register 190 which latter signal is the inverse of the OSC signal generated at the CPU and maintains the desired predetermined phase relationship between the CPU and the memory timing systems.

Figure 18E:
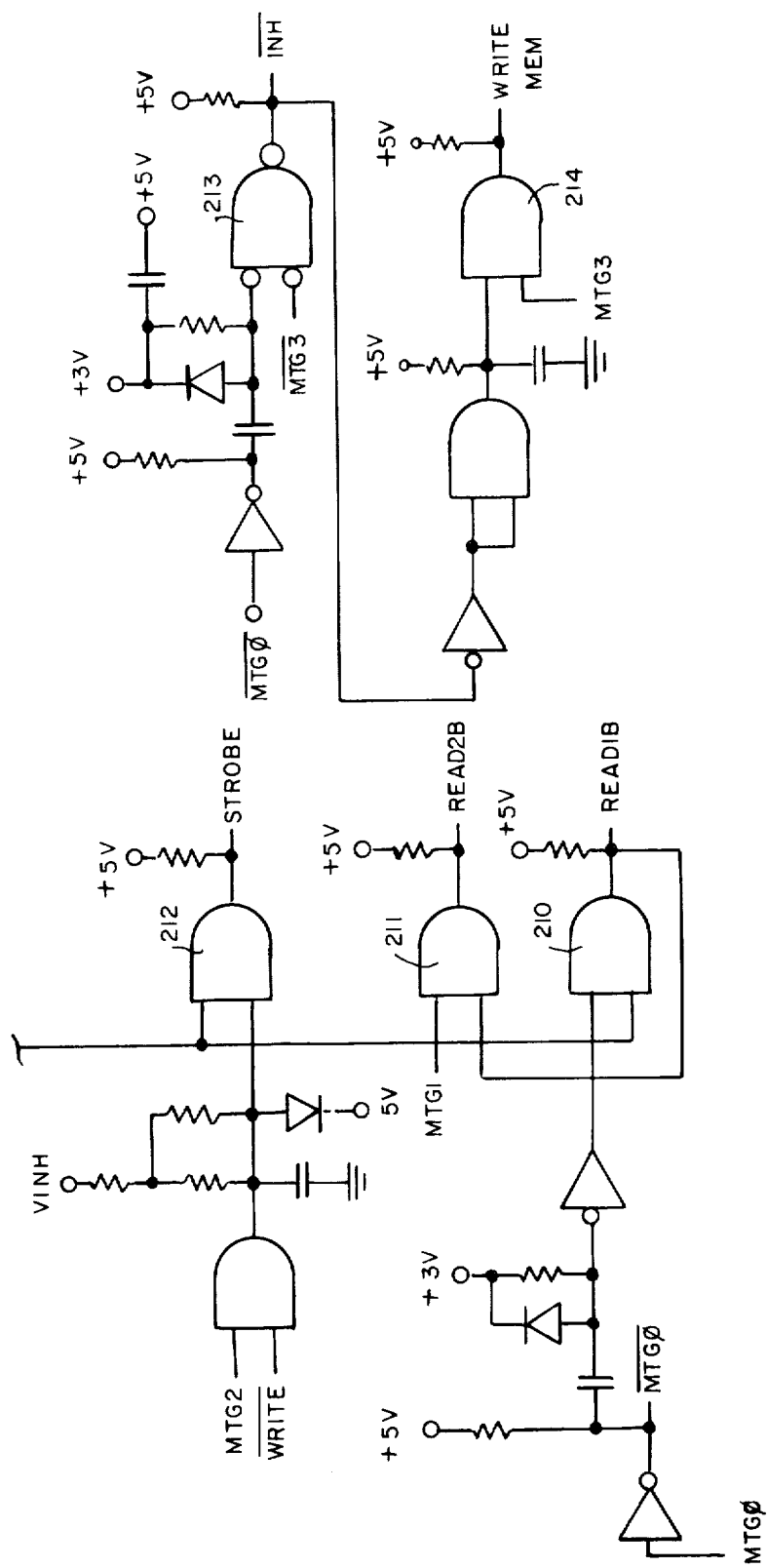
FIG. 18E shows a specific implementation of the memory control logic of FIG. 18.

The specific memory control logic 191 is shown in FIG. 18E wherein the memory timing signals MTG$\phi$-3 and the $\overline{\text{WRITE}}$ signal control the operation of the memory by producing the desired Read 1B and Read 2B at the output of logic AND units 210 and 211, the strobe signal at the output of logic AND unit 212, the inhibit $\overline{\text{INH}}$ signal at logic AND unit 213, and the WRITEMEM signal at logic AND unit 214.

The memory timing generator is appropriately enabled in the absence of a WAIT signal, when an appropriate memory address load signal (MALOAD) is present. The enabling of the memory timing generator is further controlled at its D input by the ENAB signal via the logic array 192 requiring appropriate combination of the input signals shown, including the $\overline{\text{MEMEN}}$ signal. The inhibit select signal ($\overline{\text{INHSELECT}}$) can override the selection of a memory by the CPU to permit, if desired, the external selection of a particular memory. Accordingly, the $\overline{\text{INHSELECT}}$ signal effectively overrides the $\overline{\text{MEMEN}}$ signal. Such signal can be generated via the use of an externally available switch (not shown) which, for example, grounds the input to AND gate 194 and prevents the operation, or enabling, of any of the memories. Such operation may be used, for example, when it is desired to test the memory units.

FIG. 18A shows the logic 195 for generation of the internally used $\overline{\text{WAIT}}$ signal in the memory unit. FIG. 18B shows the D flip-flop logic 196 for generation of the $\overline{\text{HOLD}}$ signal. The generation of the $\overline{\text{SYNC EN-ABLE}}$ signal is shown in FIG. 18C by logic array 197, discussed in more detail below.

Figure 19:
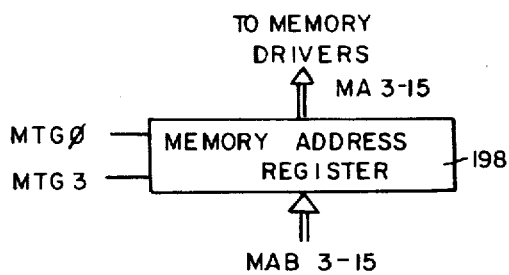
FIG. 19 shows a block diagram of the memory address register in the memory unit and the input and output signals thereto.
Figure 20:
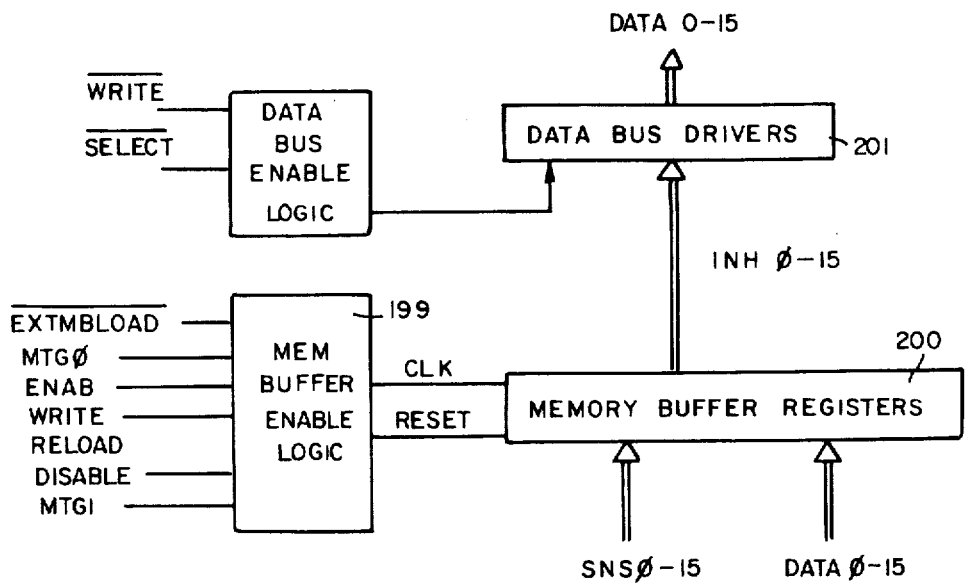
FIG. 20 shows a block diagram of the memory buffer registers and data bus drivers in the memory unit and the signals required for enabling such units.

The relationships among the input and output signals of the various memory register and driver units including the memory address register and the memory buffer registers and data bus drivers are shown in FIGS. 19 and 20. The memory address bus supplies the memory and address input (MAB 3–15) the memory address register 198 which in turn provides the appropriate memory address (MA 3–15) for the memory drivers, as shown in FIG. 19.

Appropriate memory buffer enable logic unit 199 controls the operation of the memory buffer registers 200 as shown to produce the data output bits (Data $\phi$-15) for placement on the Data/Mem bus via the data bus drivers 201. The particular logic and register units utilized for such purposes are conventional and well known units and are not described in further detail.

Before discussing exemplary operations of the computer as it moves from one state operating cycle to another in accordance with the flow and state charts of FIGS. 3 and 4, a discussion is herein given of the manner in which the various operating instruction signals are transferred over transfer buses 20–25 of FIG. 1 with reference to the particular embodiment described in the remaining figures. For example, FIG. 5 shows the generation of the memory enable signal ($\overline{\text{MEMEN}}$) which, when it is placed on the transfer bus for ultimate transfer to the memory unit, is designated in the drawing as the $\overline{\text{BMEMEN}}$ signal. As can be seen, the output circuit is a conventional D flip-flop circuit 40 in which the D input ($\overline{\text{MEMEN}}$) is transferred to the Q output on the upgoing clock signal at the C (clock) input, provided the signal on the SD terminal is high. Such signal is high when the timing signal designated as the RUN signal is present together with a signal indicating that no master reset signal is present (i.e., $\overline{\text{HRST}}$) via logic circuit 41. Effectively, such logic circuit states that the memory unit cannot be enabled if the machine is either halted (a no RUN condition) or is being reset (an $\overline{\text{HRST}}$ condition).

As can be seen from the state chart figures, the memory enable signal ($\overline{\text{MEMEN}}$) is required in those program operating states designed as the FETCH.SKIP, DEFER.AUTO and PI states in FIG. 4 or in the MRI-EXECUTE states ISZ, DSZ, LDA and STA in FIG. 4A. It should be noted in each case that such a signal is only required in a PTS$\phi$ level. The $\overline{\text{MEMEN}}$ signal is also required during data channel operation (i.e., operation with an external I/O device) when providing a data channel input (DCH IN) or output operation (DCH OUT) or a data channel increment (DCH INC) operation, either at high or low speeds, as shown in FIG. 4C. Finally, the $\overline{\text{MEMEN}}$ signal is required only for console state CST3, as shown in FIG. 4D.

The logic for generating the $\overline{\text{MEMEN}}$ signal is shown in FIG. 5. Thus, such signal is generated, first of all, by virtue of logic circuit 50, i.e., in the presence of a PTS$\phi$ signal (indicating operation at the PTS$\phi$ level), a $\overline{\text{MONEN}}$ signal (indicating that no extraneous monitoring operation is occurring), and a signal designating that one of the program states of FIGS. 4 and 4A is being utilized. Thus, in the case of a FETCH.SKIP state, both the FETCH and the $\overline{\text{SKIP}}$ signals are present (logic unit 53), in the case of a DEFER.AUTO state, both the DEFER and $\overline{\text{AUTO}}$ signals are present (logic unit 54), or in the case of an MRI-EXECUTE state wherein no Defer and no jump operation are required, both an MRI $\overline{\text{DEFER}}$ and a $\overline{\text{J}}$ signal are present (logic unit 55). Thus, the presence of any of the above discussed combinations from the appropriate logic unit together with the PTS$\phi$ and $\overline{\text{MONEN}}$ signal indicates operation in one of the program operating states of FIGS. 4 and 4A in which the $\overline{\text{MEMEN}}$ signal is required. The PTS$\phi$ signal is obtained from the program timing J-K flip-flop unit 173 shown in FIG. 13, which produces both the PTS$\phi$ and PTS1 signals in accordance with the CPU clock signal so long as there is no $\overline{\text{PTG HOLD}}$ or $\overline{\text{MONEN}}$ signal.

In cases where data channel operation occurs, the $\overline{\text{MEMEN}}$ signal is required for the state after the DCH INIT state and is controlled by the DQ0 and DQ1 signals shown at the input to the DCH ROM's 60 in FIG. 6. The 5-bit signal inputs to the DCH ROM's (DQ0 through DQ4) are represented in the DCH states shown in FIG. 4C at the first line of each. As can be seen in the data channel states requiring the presence of a $\overline{\text{MEMEN}}$ signal, the DQ0 and DQ1 bits are always 1 and 0 respectively. Thus, as shown in FIG. 5, the presence of DQ0 and $\overline{\text{DQ1}}$ (the complement of DQ1) via logic unit 51 is required to generate the $\overline{\text{MEMEN}}$ signal for data channel operation. Finally, the console state CST3 of FIG. 4D is the only one which requires the presence of the $\overline{\text{MEMEN}}$ signal, which operation is indicated with reference to logic unit 52 of FIG. 5 by the presence of ($\overline{\text{C}+\text{I}+\text{M}}$), IR6 and CST3 signals. Thus, the signal ($\overline{\text{C}+\text{I}+\text{M}}$) is a signal which goes low whenever any one of the three console switches indicated [i.e., the CONTINUE switch (C), the INSTRUCTION STEP switch (I) or the MEMORY STEP switch (M)] is activated.

Thus, the generation of the $\overline{\text{MEMEN}}$ signal is accomplished by the appropriate logic shown in FIG. 5, which logic is associated with the various program, DCH, or Console states in which the $\overline{\text{MEMEN}}$ signal is required as designated by the state charts of FIGS. 4–4D.

The $\overline{\text{WRITE}}$ signal is required for those states which provide for incrementing or decrementing, such as AUTOINC and AUTODEC defer states of FIG. 4, the ISZ and DSZ states of FIG. 4A and the DCH INC state of FIG. 4C. Further, such signal is required when storing (writing) data into a memory location (STA) as in FIG. 4A or when providing data channel inputs either at low speed or high speed operation (DCH IN), as in FIG. 4C. Further, the $\overline{\text{WRITE}}$ signal is required only in console state CST3 as shown in FIG. 4D.

Thus, the $\overline{\text{WRITE}}$ signal is made available from the DCH ROM's 60 (see FIG. 6) for the required data channel states of FIG. 4C, from the MRI ROM's 70 (see FIG. 7) for the MRI-EXECUTE states of FIG. 4A, from the SPEC ROM's 80 (see FIG. 11) for the AUTOINC and AUTODEC states of FIG. 4 and from the console ROM 90 (see FIG. 9) for the CST3 state of FIG. 4D.

The $\overline{\text{WE}}$ (or "write enable") signal is generated as shown in FIG. 12 at a fixed time in the cycle so long as the $\overline{\text{WRITE}}$ signal has been generated. Thus, in the D flip-flop 100 shown in FIG. 12 the $\overline{\text{WRITE}}$ signal is transferred from the D input to the Q output to be available as the $\overline{\text{WE}}$ signal when the flip-flop 100 is enabled by the CPU clock signal on the up-going part of the oscillator signal at the C input. As can be seen, the $\overline{\text{WE}}$ signal always occurs at a specified point in an overall operating state cycle following the generation of the $\overline{\text{WRITE}}$ signal via the operation of such logic of FIG. 12.

The $\overline{\text{RMW}}$ (or "read-modify-write") signal is needed when the operation requires the reading of data from the memory unit and the modifying of such data prior to writing such data back into the memory unit. Thus, as can be seen in FIG. 4A, such operation occurs in an increment (ISZ) or decrement (DSZ) cycle of the MRI-EXECUTE states, the $\overline{\text{RMW}}$ signal in such case being generated by the MRI ROM's 70, as shown in FIG. 7. With reference to FIG. 4, in going from a DEFER-.$\overline{\text{AUTO}}$ to an AUTOINC or an AUTODEC state a SET AUTO signal is generated and from the presence thereof an $\overline{\text{RMW}}$ signal must be generated as shown in the DEFER.$\overline{\text{AUTO}}$ state of FIG. 4. The logic for such purpose is shown in FIG. 8A wherein the presence of $\overline{\text{RMW}}$ and $\overline{\text{SET AUTO}}$ signals at the input of logic unit 110 generates the desired "read-modify-write" operating signal, designated as the $\overline{\text{BRMW}}$ signal in the figure.

With reference to data channel operation, the $\overline{\text{RMW}}$ signal is required for low speed data channel input (DCH IN-LOW) operation and for data channel increment (DCH INC) operation as shown in FIG. 4C. In such case the $\overline{\text{RMW}}$ signal is generated at the DCH ROM's shown in FIG. 6.

In addition to the above signals the memory unit generates the $\overline{\text{SYNC ENABLE}}$ signal and the internally used $\overline{\text{WAIT}}$ signal, the generation of the former signal is shown in FIG. 18C. As seen therein, when the MEMEN signal has been generated and the appropriate memory has been selected (SELECT) and when the memory clock signals (MTG$\phi$ and MTG2) are present, the $\overline{\text{SYNC ENABLE}}$ signal is generated for transfer to the CPU to halt the operation thereof while the appropriate operation with the selected memory occurs in the memory unit.

The generation of the $\overline{\text{WAIT}}$ signal is shown in FIG. 18A, the logic thereof operating so that if an "enable" (ENAB) signal which enables the memory buffer registers is low to indicate operation of a selected memory device, or if the $\overline{\text{MTG3}}$ signal from the memory timing system is low, the $\overline{\text{WAIT}}$ signal is generated and, accordingly, prevents the $\overline{\text{MEMEN}}$ signal from enabling another memory unit, in accordance with the logic shown in FIG. 18.

The ROM logic for controlling the operation in each of the operating states is shown in FIGS. 6, 7, 9, 10 and 11. For example, the SPEC ROM's $\phi$ and 1 shown in FIG. 11 each utilize five input control signals identified as PI (program interrupt), $\overline{\text{FETCH}}$, $\overline{\text{AUTO}}$, $\overline{\text{PTS}\phi}$ and a signal derived from the $\overline{\text{SKIP}}$ and $\overline{\text{AUTODEC}}$ signals via logic OR unit 112. All of the conditions required for operation in any of the program operating states shown in FIG. 4 can be identified by the five-bit coded inputs to SPEC ROM's $\phi$ and 1 which thereupon produce a desired combination of output signals from the Y-outputs thereof as shown. The signals generated at the ROM outputs correspond to the signals required for each of the program operating states shown in FIG. 4 relating to the "fetch" and "defer" operations described therein. Thus, by the use of only two ROM units, appropriately enabled by an enable signal identified as the SPECEN signal, the control of the "fetch" and "defer" program operating states of FIG. 4 is achieved. The SPECEN signal is generated as shown in FIG. 11 via logic units 111 in the presence of either a FETCH or a DEFER signal and in the absence of a monitor enable signal ($\overline{\text{MONEN}}$).

In a similar manner control for the MRI-EXECUTE program operating states of FIG. 4A is shown in FIG. 7 wherein MRI ROM units 120 and 121 are each five-bit input ROM's controlled by input signals $\overline{\text{IR1}}$ through $\overline{\text{IR4}}$ and the PTS$\phi$ signal. Such ROM's require no further input logic other than the logic required for enabling them through the appropriate combination of the MRI, DEFER, $\overline{\text{MONEN}}$ signals via logic AND unit 122 which produce the desired $\overline{\text{MRIEN}}$ signal connected to the ENABLE terminals of the ROM units. Accordingly, once enabled, a particular program operating state of the MRI-EXECUTE state group of FIG. 4A is determined by an appropriate combination of the five input signals to the ROM units which thereupon generate the desired ROM output signals required for the selected operating state, as shown at the Y-outputs of the ROM units 70.

With reference to the arithmetic and I/O program operating states of FIG. 4B, a single ROM unit shown as ROM 130 in FIG. 10 is utilized, its five-bit input being determined by the combination of signals from the instruction register identified as IR bits $\overline{\text{IR}\phi}$, IR5, IR6, $\overline{\text{IR7}}$, $\overline{\text{IR8}}$ and $\overline{\text{IR9}}$, together with the PTS$\phi$ signal. Two of the ROM input signals require a specified combination of IR bits. For example, the IR8 and IR9 bits control one of the inputs to ROM 130 via logic OR unit 131 and the IR5 and IR6 bits control another input thereto via logic AND unit 132. The ROM enable signal ($\overline{\text{IOALCEN}}$) is determined by the desired combination of $\overline{\text{FETCH}}$, $\overline{\text{MRI}}$ and $\overline{\text{MONEN}}$ signals, so that when ROM unit 130 is enabled an appropriate combination of input signals thereto provides the desired operating state signals at the Y-outputs of ROM 130 as required for a selected program operating state of the state group set forth in FIG. 4B.

External data channel operation is controlled with only slightly more complicated input control logic utilizing a pair of DCH ROM units ROM$\phi$ and ROM1 shown in FIG. 6, each of which is, as in the previously described state ROM's, a five-bit input ROM. The input signals are obtained directly or are derived indirectly from the output of a DCH register 142 such as available as Model 93H72 made by Fairchild Semiconductor Corporation, Mountainview, California. The latter register is clocked at its clock pulse input (CP) by the CPU clock signal and is enabled by the $\overline{\text{DCH}}$ signal. The P-inputs of DCH register 142 are controlled by the MONA signal (a form of intermediate $\overline{\text{DCHA}}$ signal obtained as described below with reference to logic units 143-145), and the DCHM$\phi$ and DCHM1 obtained from the external I/O device in question. The DCHM$\phi$ and DCHM1 signals specify the desired operation required by the I/O device being serviced by the data processor (e.g., an input, output, or increment operation). The MONA signal indicates the change in mode of operation with reference to the I/O device. The four Q-outputs from the DCH register 142 provide, either directly or indirectly, the input signals to the DCH ROM units for appropriate generation of the desired output signals therefrom for the DCH states shown in FIG. 4C. Four of such input signals are provided directly as DQ0–DQ3 while the fifth input signal supplied to the DCH ROM units via line 146 is generated, as shown in FIG. 6, by an appropriate combination of the DQ0, DQ1 and $\overline{\text{DCH}}$ enable signal applied to logic AND units 143 and 144 which generate an intermediate $\overline{\text{DCHA}}$ which is appropriately combined with the FAST signal in the logic units 145. The FAST signal is determined by the I/O device being serviced and controls the operation of the system to provide for either fast or slow speed operation, such signal in effect informing the data processor of the priority of the I/O device so that high speed I/O devices are serviced ahead of low speed I/O devices.

With reference to console state operation as shown in FIG. 4D, such operation is controlled by a pair of console ROM units 150 and 151 shown in FIG. 9, each of which is controlled by a five-bit input control signal. For ROM unit 150 the input is determined by instruction register (IR) bits $\phi$, 1, 5 and 7 and the PL signal obtained from the actuation of the program load (PL) switch at the console.

Console ROM 151 is controlled by the IR6 bit of the instruction register, a signal representing the actuation at the console of any one of three designated console switches (i.e., the CONTINUE, INSTRUCTION STEP, or MEMORY STEP switches) as indicated by the $(\overline{\text{C}+\text{I}+\text{M}})$ signal, a RESTART signal, the PL signal and a signal derived from the IR$\phi$ and IR2 bits via logic unit 152. Console ROM 150 is enabled in accordance with the $(\overline{\text{C}+\text{I}+\text{M}})$ signal and the console state 2 signal (CST2), while console ROM 151 is enabled in accordance with the console state 3 signal ($\overline{\text{CST3}}$). Accordingly, all the appropriately desired operating signals for operating in the console states of FIG. 4D are thereby obtained at the outputs of the pair of console ROM units 150 and 151 shown in FIG. 9.

Thus, it can be seen that the operating states of the data processing system of the invention are readily controlled through relatively simple logic utilizing separate, and effectively independently operated ROM arrays (as shown in FIGS. 6, 7, 9, 10 and 11) for each of the operating state groups of FIGS. 4–4D without the need for a more extensive microprocessor ROM array requiring a relatively long microprocessor word and the accompanying elaborate control logic for decoding such word.

As a first example showing the operation of the computer of the invention utilizing the above discussed operating instruction signals and state logic in accordance with the flow and state charts of FIGS. 3 and 4, let us assume that a program instruction requires the contents of accumulator $\phi$ (AC$\phi$) in the CPU register file to be added to the contents of accumulator 1 (AC1) and the result to be deposited in AC1 (i.e., AC$\phi\lambda$ +AC1$\rightarrow$ AC1).

All operations of the computer effectively start in the FETCH.$\overline{\text{SKIP}}$ state at state level PTS$\phi$ as shown in FIG. 4. Such starting point is also shown in the flow chart of FIG. 3 at point 40 representing a "Fetch" and "No Skip" operation.

The first requirement is to fetch the above instruction from the appropriate memory location and to feed the same to the Instruction Register (IR) of the computer. In order to do this, the three operations designated at the FETCH.$\overline{\text{SKIP}}$ cycle of FIG. 4 are performed. Thus, the data in the program counter (PC) register must be placed in the memory address (MA) register of the register file, the program counter data must be incremented by 1 and the result deposited in the program counter register and, finally, the instruction data from the appropriately addressed instruction location must be placed in the Instruction Register. In order to perform such operations these principal signals are required: $\overline{\text{2REN}}$, $\overline{\text{2WEN}}$, $\overline{\text{1WEN}}$ (for enabling the 2R, 2W and 1W ports, respectively, of the register file), 2WRA-DR1 (for putting the appropriate address on the 2W and 2R ports), $\overline{\text{INCA}}$ (for incrementing the A-input of the ALU), $\overline{\text{MEMEN}}$ (for enabling the memory unit), $\overline{\text{LOA-DIR}}$ (for loading the IR unit) and CLEAR FETCH (to prepare for the next cycle).

In this operation the special read-only memories (SPEC ROM's) shown in FIG. 11 are utilized, such ROM's being designated by reference numeral 110. In the initial FETCH.$\overline{\text{SKIP}}$ state of the computer, the $\overline{\text{Fetch}}$ and the $\overline{\text{Skip}}$ inputs of such ROM's go low while the PTS$\phi$ stays high and all the other inputs remain high, such condition thereby producing from the SPEC ROM's, when appropriately enabled by an SPECEN signal, the following outputs:

$\overline{\text{2REN}}$
$\overline{\text{2WEN}}$
$\overline{\text{1WEN}}$
2WRADD1
$\overline{\text{INCA}}$
$\overline{\text{LOADIR}}$ Further, when the Fetch input to the $\overline{\text{MEMEN}}$ logic shown in FIG. 5 remains high, while the $\overline{\text{Skip}}$ input thereto goes low (all the remaining signals being high), the desired $\overline{\text{MEMEN}}$ signal is produced to enable the memory unit. Accordingly, all of the desired signals required for the FETCH.$\overline{\text{SKIP}}$ cycle are produced.

At the CPU register file of FIG. 2 the contents of the program counter are at the 2R port with the generation of the $\overline{\text{2REN}}$ signal such contents are also placed at the 1W port thereof. The generation of the $\overline{\text{1WEN}}$ signal appropriately writes the contents of the 1W port into the memory address register (PC $\rightarrow$ MA).

The A-input of the ALU also has the program counter content deposited thereon from the 2R output and the generation of the $\overline{\text{INCA}}$ signal causes the A-input to be incremented by 1 (PC+1) and the incremented contents to be placed on the output of the ALU. Such output is transferred through the shifter (without shifting) to the 2W port whereupon the incremented PC is written into the program counter register (PC+1 $\rightarrow$ PC).

The PC content is also at the IR port of the register file where it is placed on the memory address bus (MADR) so as to enable the desired memory location in the memory unit. Such memory location contains the specified instruction (AC$\phi$+AC1→ AC1). The presence of the memory enable signal ($\overline{\text{MEMEN}}$) and transfer of the memory location address puts the instruction data from such memory location on to the Data/Mem bus via the appropriate memory buffer, so long as there is no $\overline{\text{WRITE}}$ signal present. In the case of the FETCH.SKIP cycle, such is the case. The instruction data on the Data/Mem bus is thereby deposited in the Instruction Register. Because the FETCH.SKIP cycle does not generate a $\overline{\text{PTG HOLD}}$ signal, the next state to which the computer must pass must be at a PTS1 state level of FIGS. 4–4D.

The instruction register signal contains the information which determines the next state to which the machine will progress to complete the program instruction. For example, the binary state of the IR$\phi$ bit will cause the computer to pass to the DEFER.$\overline{\text{AUTO}}$ state at the PTS1 state level if the IR$\phi$ bit is a zero, while the computer will pass to the ALC state at the PTS1 level if the IR$\phi$ bit is a 1.

In the example under discussion, the IR$\phi$ bit is a 1 and an arithmetic calculation is indicated wherein the contents of a source accumulator (ACS) and the contents of a destination accumulator (ACD) are operated upon arithmetically and the result deposited in the destination accumulator. In this case, the source accumulator is identified by the IR1, 2 bits while the destination accumulator is identified by the IR3, 4 bits, with the arithmetic calculation being specified by the IR5, 6, 7 bits. In the particular example under discussion, the IR word would identify the source accumulator as AC$\phi$, the destination accumulator as AC1 and the arithmetic calculation as an "ADD". What is present at the 2R port of the register file in FIG. 2 is also dependent on the IR5 bit and whether the result is written back into the register file at the 2W port is determined by the IR12 bit. In this case the contents of AC$\phi$ at the IR port are fed to the B-input of the ALU and the contents of AC1 at the 2R port are fed to the A-input thereof. The IR5, 6 and 7 bits control the ALU operation to add the A and B inputs, the output of the ALU being fed back to the 2W input which is appropriately enabled by a $\overline{\text{2WEN}}$ signal to deposit the addition into the AC1 register to complete the desired instructions (AC0+AC1→ AC1).

The computer is reset to the Fetch state for the next instruction by the SET-FETCH signal. Since no $\overline{\text{PTG HOLD}}$ signal appears in the ALC cycle the computer thereby passes to the FETCH.SKIP PTS$\phi$ state level.

As can be seen in FIG. 18c, at the time the $\overline{\text{MEMEN}}$ signal is present and the desired memory is selected during the FETCH.SKIP cycle, a $\overline{\text{SYNC ENABLE}}$ signal is generated for an appropriate time determined by the appropriate memory timing generator signals, the $\overline{\text{SYNC ENABLE}}$ signal then being supplied to the CPU from the memory unit via the appropriate transfer bus. As seen in FIG. 12, the presence of such signal at the CPU interrupts the operation of the main CPU timing generator to prevent further operation of the CPU until the memory cycle has been completed.

Another example of the use of the operating instruction signals transferred between the CPU and the memory unit is discussed below to illustrate the use of the $\overline{\text{WRITE}}$ and $\overline{\text{WE}}$ signals. For such example let us assume a sample instruction which requires the transfer of data contained in accumulator $\phi$ (AC$\phi$) to a memory location 100, which instruction can be represented as the store instruction, STA$\phi$, 100.

In such instruction with particular reference to the state chart of FIGS. 4 and 4A, the computer must pass through three operating state cycles in order to complete the instruction, namely, the FETCH.SKIP state (PTS$\phi$ level), the DEFER.$\overline{\text{AUTO}}$ state (PTS1 level), and the STA state (PTS$\phi$ level). The state progression is discussed in detail below, except for the "fetch instruction" operation in the first FETCH.SKIP cycle which is essentially the same as already discussed above. At the end of such FETCH.SKIP cycle the IR is loaded with the desired instruction derived from the appropriate memory indicated by the program counter.

In accordance with such instruction the progression to the next state is again determined by the IR word and, in this example, if the IR$\phi$ bit is a 0 and IR1, 2 bits are not both 1, the computer moves to the DEFER.$\overline{\text{AUTO}}$ state (PTS1 level) where the effective address, in this case the address of memory location 100, is deposited in the memory address register (EFA→ MA). This address is determined by appropriate instruction register bits. In accordance with the particular computer being described, addresses are generally specified in accordance with four address modes identified with reference to instruction register bits 6 and 7, as in the previously known NOVA configuration. In Mode 0 (page 1 of the memory), if IR bits 6 and 7 are both zero then IR bits 8 through 15 identify the required address directly. If any of the other three modes are identified by IR bits 6 and 7, bits 8 through 15 are used as an offset which must be added either to the contents of the program counter in order to get the required address (mode 1), to the contents of AC2 (for mode 2), or to the contents of AC3 (mode 3). In any event, a desired address, in accordance with one of the above four address modes, is then placed in the MA register at the 2W port of the register file.

In the case in question the address of memory location 100 is a Mode 0 address and IR bits 8 through 15 are supplied directly to the A-input of the ALU so that the address appears at the output of the ALU whereupon it is transferred through the shifter (unshifted) to the 2W port which is enabled by the presence of a $\overline{\text{2WEN}}$ signal, so as to place the contents thereof into AC$\phi$.

Once the execution of the DEFER.$\overline{\text{AUTO}}$ (PTS1) state is completed, the progression to the next computer state is determined by IR bits 1-5 which causes the machine to move to the STA state (PTS$\phi$ level) in which the effective address stored in the MA register is now used to identify the appropriate memory location in the memory unit and the data in AC$\phi$ transferred thereto. The transfer of such address and data is indicated in the STA state by the designations (MA→ MADR) wherein the contents of the MA register are put on the memory address but for transfer to the memory unit, and (ACX→ DATA) wherein the contents of a specified accumulator, in this case AC$\phi$, are transferred via the Data/Mem bus to the addressed memory location.

The 1R port of the register file is effectively always enabled except in a program interrupt (PI) state so that the contents of the MA register are automatically transferred on to the memory address bus from such port to the memory unit for identifying the appropriate memory into which the accumulator data is to be deposited. The memory unit must be appropriately enabled for such purpose and, accordingly, a $\overline{\text{MEMEN}}$ signal must be present in this cycle and again is generated as shown in the block diagram of FIG. 5. The inputs to the MRI ROM's of FIG. 7, namely, IR bits 1-4 and PTSφ signal cause the generation of the signals indicated at the output thereof which correspond to the same signals indicated in the state chart of FIG. 4A, namely $\overline{\text{2REN}}$, $\overline{\text{SET FETCH}}$, $\overline{\text{PTG HOLD}}$, $\overline{\text{WRITE}}$, and F34. When all signals go low, the $\overline{\text{WRITE}}$ signal disables the output memory buffer of the addressed memory location so that it is removed from the Data/Mem bus so as to prevent any data from being placed on the data/Mem bus from the memory unit at the time data is being obtained from the CPU for writing into the appropriate memory location. The $\overline{\text{F34}}$ signal identifies the location of the data which is to be transferred (in this case, ACφ), which data is thereupon put on the 2R port enabled by the $\overline{\text{2REN}}$ signal to cause the contents of ACφ to be put on the Data/Mem bus. Such data is written into the selected memory location by the generation of a $\overline{\text{WE}}$ signal which is automatically timed to be generated at a specified time after the generation of the $\overline{\text{WRITE}}$ signal to cause the data on the Data/Mem bus to be written into the desired memory location. The $\overline{\text{WE}}$ signal always follows the $\overline{\text{WRITE}}$ signal and is automatically generated in the CPU in accordance with the $\overline{\text{WRITE}}$ signal and the CPU clock signal so as to occur at the same point in each cycle.

Accordingly, at the end of the STA cycle, the data stored in ACφ has been deposited in memory location 100 as required and the machine returns to its fetch cycle (by the presence of the SET FETCH) to await the next instruction.

Another example of the use of the operating instruction signals transferred between the CPU and the memory unit is discussed below to illustrate the use of the $\overline{\text{MEMEN}}$, $\overline{\text{WRITE}}$, $\overline{\text{WE}}$, $\overline{\text{SYNC ENABLE}}$ and $\overline{\text{RMW}}$ signals. For such example let us assume a sample instruction which requires the transfer of data from a specified memory location (e.g., location 100) to the CPU where it is incremented by one and returned to the same memory location. At the same time if the incremented data is zero, the next instruction is to be skipped. Such instruction can be identified as an "increment and skip on zero" instruction, in this case with reference to the contents of memory location 100 (i.e., ISZ 100).

In such instruction with particular reference to the state charts of FIGS. 4 and 4A, the computer must pass through four operating state cycles in order to complete the instruction, namely, a FETCH.$\overline{\text{SKIP}}$ state (PTSφ level), a DEFER.$\overline{\text{AUTO}}$ state (PTS1 level), and ISZ state (PTSφ level) and an ISZ state (PTS1 level). The state progression is discussed in detail below except for the "FETCH instruction" operation in the first FETCH.$\overline{\text{SKIP}}$ cycle which is essentially the same as already discussed above in the previous examples. At the end of the FETCH.$\overline{\text{SKIP}}$ cycle, the instruction register is loaded with the desired instruction obtained from the appropriate memory location indicated by the program counter.

The progression to the next state is again determined by appropriate bit locations in the instruction and, in this example, the computer moves to the DEFER.$\overline{\text{AUTO}}$ state (PTS1 level) where the effective address (EFA) (i.e., the address of the desired memory location 100) is deposited in the memory address (MA) register (EFA → MA).

At the completion of the DEFER.$\overline{\text{AUTO}}$ cycle, appropriate bit locations in the instruction then cause the machine to progress to the ISZ (PTSφ) state where the address in the MA register is placed on the memory address bus to select the appropriate memory location 100 (MA → MADR) and the data contained therein is placed on the Data/Mem bus, through the enabling of the memory unit by the $\overline{\text{MEMEN}}$ signal. Such data is fed directly to the ALU where the presence of an INCA signal causes such data to be incremented by one and placed in a register of the register file via the enabling of the 2W port by a $\overline{\text{2WEN}}$ signal. In order to read the data from the desired memory location and provide sufficient time to modify the data and to permit the modified data to be returned and written back into the same memory location, the $\overline{\text{RMW}}$ signal must be present at the output of the MRI ROM's.

In accordance with appropriate bit locations in the instruction word the machine then progresses to the final cycle (i.e., the ISZ (PTS1 state) wherein the incremented data in the TEMP1 register is placed on the Data/Mem bus (TEMP1 → DATA) for writing into the appropriate memory location (i.e., memory location 100) designated by the MA register (MA → MADR). For this purpose the 2R port must be enabled by the $\overline{\text{2REN}}$ signal; the $\overline{\text{WRITE}}$ signal is present to prevent the placement of data onto the Data/Mem bus from the memory unit preparatory to writing the incoming data into the memory unit; the $\overline{\text{WE}}$ signal is present to permit the writing of the data on the data bus into the desired memory location; the IR port is enabled by the $\overline{\text{IREN}}$ signal to place the memory address on the memory address bus and, finally, the $\overline{\text{SET FETCH}}$ signal is present to return the machine to its initial "Fetch" state for the next instruction. Accordingly, the data from TEMP1 on the Data/Mem bus is written into the memory location designated by the MA register.

Although the above description depicts a specific embodiment of the invention, the particular implementation thereof may be modified and equivalent but different implementations may be devised by those in the art within the scope of the invention. Accordingly, it is desired that the invention not be limited by the specific details of the embodiment described in this specification except as defined by the appended claims.

What is claimed is:

1. A data processing system comprising
    a central processor unit for processing address words and data words and at least one memory unit connected in communication with said central processor unit for storing address words and data words,
    said central processor unit including
    a skew protected quadriport register file having first and second read ports and first and second write ports for permitting the writing of information into said register file subsequent to the reading of information therefrom during the same processor cycle has been inserted;
    an arithmetic logic unit having a first input, a second input and an output;
    a parallel shifter unit having an input and an output;
    said first read port of said register file connected to said first input of said arithmetic logic unit for supplying address words or data words to said arithmetic logic unit;
    said second read port of said register file connected to said second input of said arithmetic logic unit and to said first write port of said register file for supplying address words or data words to said arithmetic logic unit or to said first write port;

the output from said arithmetic logic unit connected to the input of said shifter unit and the output of said shifter unit connected to said second write port of said register file for writing the logic unit result in parallel into the register file.

2. A data processing system in accordance with claim 1 for handling up to 16-bit address words and data words wherein
said register file comprises
eight storage register means each capable of being connected to one of said first and second read ports and to one of said first and second write ports,
said eight storage register means consisting including
a memory address register,
four accumulator registers,
a program counter register; and
two temporary registers,
means for controlling the connections of said two read and said two write ports to said storage register means of said register file so that each read port can independently access the contents of any of said storage register means and each write port can independently modify the contents of any of said storage register means; and
said arithmetic logic unit comprises
means for arithmetically and logically operating upon two input words having up to 16 bits to produce one output word having up to 16 bits; and
means for selectively controlling the operation of said arithmetic logic unit to provide said arithmetic or logic operations.

3. A data processing system in accordance with claim 1 and further including
an instruction register having an input connected in communication with said at least one memory unit and having an output for supplying an instruction word;
an input multiplexer unit having first and second inputs and an output, a seclected number of bits from the instruction word at the output of said instruction register being connected to said first input of said multiplexer unit and data words received from said at least one memory unit being connected to said second input of said multiplexer unit, and the output of said multiplexer unit being connected to said second read port and said first write port of said register file for connecting the resultant from the multiplexor unit to the register file or the arithmetic logic unit.

4. A data processing system in accordance with claim 3 and further including
a memory address bus connected between said at least one memory unit and said first read port for carrying address words from said register file for entering into said at least one memory unit.

5. A data processing system in accordance with claim 4 further including
at least one input/output device;
a bidirectional memory/data bus means connected to said memory unit and to said input-output device for carrying data words to and from said at least one memory unit and said at least one input/output device; and
memory/data bus driver means connected to said second read port and further connected to said memory/data bus means for placing information from said register file onto the memory/data bus for entry into daid at least one memory unit.

* * * * *

UNITED STATES PATENT AND TRADEMARK OFFICE
CERTIFICATE OF CORRECTION

PATENT NO. : 4,075,692

DATED : February 21, 1978

INVENTOR(S) : Karsten Sorensen; David H. Bernstein and Michael B. Druke

It is certified that error appears in the above-identified patent and that said Letters Patent are hereby corrected as shown below:

Column 24, line 56, delete "has been inserted".

Signed and Sealed this

Fourteenth Day of November 1978

[SEAL]

Attest:

RUTH C. MASON
Attesting Officer

DONALD W. BANNER
Commissioner of Patents and Trademarks